US012701546B2

(12) United States Patent
Li

(10) Patent No.: US 12,701,546 B2
(45) Date of Patent: Aug. 4, 2026

(54) PAGING METHOD AND APPARATUS USING SAID METHOD

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 293 days.

(21) Appl. No.: 18/290,011

(22) PCT Filed: May 10, 2021

(86) PCT No.: PCT/CN2021/092873
§ 371 (c)(1),
(2) Date: Nov. 8, 2023

(87) PCT Pub. No.: WO2022/236622
PCT Pub. Date: Nov. 17, 2022

(65) Prior Publication Data
US 2024/0381310 A1     Nov. 14, 2024

(51) Int. Cl.
*H04W 68/02*     (2009.01)
*H04W 76/27*     (2018.01)

(52) U.S. Cl.
CPC ........... *H04W 68/02* (2013.01); *H04W 76/27* (2018.02)

(58) Field of Classification Search
CPC .............................. H04W 68/02; H04W 76/27
USPC ........................................................ 455/458
See application file for complete search history.

(56) References Cited

U.S. PATENT DOCUMENTS

| | | |
|---|---|---|
| 2018/0110029 A1 | 4/2018 | Kim et al. |
| 2019/0182800 A1 | 6/2019 | Park et al. |
| 2019/0239191 A1 | 8/2019 | Zee et al. |
| 2019/0289534 A1* | 9/2019 | Ryoo .................... H04W 48/18 |
| 2019/0313364 A1 | 10/2019 | Liang et al. |
| 2020/0029301 A1 | 1/2020 | Li et al. |
| 2020/0329455 A1 | 10/2020 | Ryu et al. |
| 2023/0119167 A1* | 4/2023 | Niu ........................ H04W 76/28 |
| | | 455/458 |

(Continued)

FOREIGN PATENT DOCUMENTS

| | | |
|---|---|---|
| CN | 108024221 A | 5/2018 |
| CN | 108401290 A | 8/2018 |

(Continued)

OTHER PUBLICATIONS

International Search Report of PCT/CN2021/092873 dated Feb. 10, 2022 with English translation, (5p).

(Continued)

*Primary Examiner* — Hirdepal Singh
(74) *Attorney, Agent, or Firm* — Arch & Lake LLP; Hao Tan; Shen Wang

(57)     ABSTRACT

Embodiments of the present disclosure disclose a paging method and an apparatus using said method, which can be applied in the field of communication technology. A method executed by an access network device comprises: receiving paging assistance information corresponding to a terminal device sent by a core network device; and determining first paging group information of the terminal device when in an inactive state according to the paging assistance information.

17 Claims, 5 Drawing Sheets

Receive first indication information sent by the core network device, where the first indication information is at least used to indicate whether the access network device is allowed to determine the first paging group information based on the paging assistance information — 31

Based on the core network assistance information for RRC inactive, receive paging assistance information corresponding to the terminal device sent by the core network device — 32

Based on the paging auxiliary information, determine the first paging group information when the terminal device is in the inactive state — 33

When the terminal device is in the inactive state, send a paging message to the terminal device based on the first paging group information — 34

(56) References Cited

U.S. PATENT DOCUMENTS

| | | | | |
|---|---|---|---|---|
| 2023/0254769 A1* | 8/2023 | Shi | ...................... | H04W 68/005 |
| | | | | 370/311 |
| 2023/0276407 A1* | 8/2023 | Berggren | .......... | H04W 52/0216 |
| | | | | 370/329 |
| 2023/0397167 A1* | 12/2023 | Murray | ............... | H04W 68/025 |
| 2024/0188040 A1* | 6/2024 | Wu | ...................... | H04W 76/28 |

FOREIGN PATENT DOCUMENTS

| | | |
|---|---|---|
| CN | 109151849 A | 1/2019 |
| CN | 109845361 A | 6/2019 |
| CN | 111372303 A | 7/2020 |
| CN | 112087795 A | 12/2020 |
| IN | 201917052066 A | 1/2020 |

OTHER PUBLICATIONS

Ericsson, "Additional paging information for RRC inactive state", SA WG2 Meeting #123, S2-176996, Oct. 23-27, 2017, Ljubljana, SI, (4p).

3GPP TS 38.304 V17.6.0 (Sep. 2023-09), Technical Specification, 3rd Generation Partnership Project; Technical Specification Group Radio Access Network; NR; User Equipment (UE) procedures in Idle mode and RRC Inactive state (Release 17), (51p).

First Office Action of CN202180001502.4 dated Feb. 22, 2025 with English translation, (18p).

Notice of Allowance of CN 202180001502.4 dated Dec. 3, 2025, (6p).

Huawei et al., "Paging enhancements for idle/inactive-mode UE," 3GPP TSG-RAN WG2 Meeting #112 electronic online, Nov. 2-13, 2020, R2-2010244, (5p).

Huawei et al., "Discussion on paging enhancements," 3GPP TSG-RAN WG2 Meeting #111 electronic online, Aug. 17-28, 2020, R2-2007441, (8p).

Huawei et al., "Paging enhancements for idle/inactive-mode UE," 3GPP TSG-RAN WG2 Meeting #113 electronic online, Jan. 25-Feb. 5, 2021, R2-2101274, (9p).

MediaTek Inc., "Paging Enhancements for UE Power Saving in NR," 3GPP TSG-RAN WG2 Meeting #112-e online Nov. 2-13, 2020, R2-2009785, (5p).

LG Electronics Inc., "Discussion on paging assistance information in RRC-Inactive state", 3GPP TSG-RAN WG3 Meeting #97bis, Prague, Czech Republic Oct. 9-13, 2017, R3-173871, (10p).

Qualcomm Incorporated, "Introduction of NR operation with Shared Spectrum Access to Stage 2," 3GPP TSG-RAN2#109e, R2-2001922, Feb. 24-Mar. 6, 2020, (13p).

Qualcomm Incorporated, "RRC inactive RAN paging failure handling," SA WG2 Meeting #S2-122BIS, S2-175752, Sophia Antipolis, France, Aug. 21-25, 2017, (3p).

Ericsson, "Minor corrections to paging," 3GPP TSG-RAN2 Meeting #104, R2-1817150, Spokane, USA, Nov. 12-16, 2018, (4p).

Catt, "(TP for BL CR for TS 38.300) Support of Location based Paging for NTN," 3GPP TSG-RAN WG3#111-e, R3-210471, e-meeting, Jan. 25-Feb. 4, 2021, (5p).

Samsung, "Summary of AI 8.3.3: UE notification on network switching for multi-SIM," 3GPP TSG-RAN WG2 Meeting #113bis-e, R2-2104319, Online, Apr. 12-2, 2021, (14p).

* cited by examiner

Access Network Device 13

Terminal
Device 12

Core Network
Device 11

| Receive paging assistance information corresponding to the terminal device sent by the core network device | 21 |
| Determine the first paging group information when the terminal device is in the inactive state based on the paging assistance information | 22 |

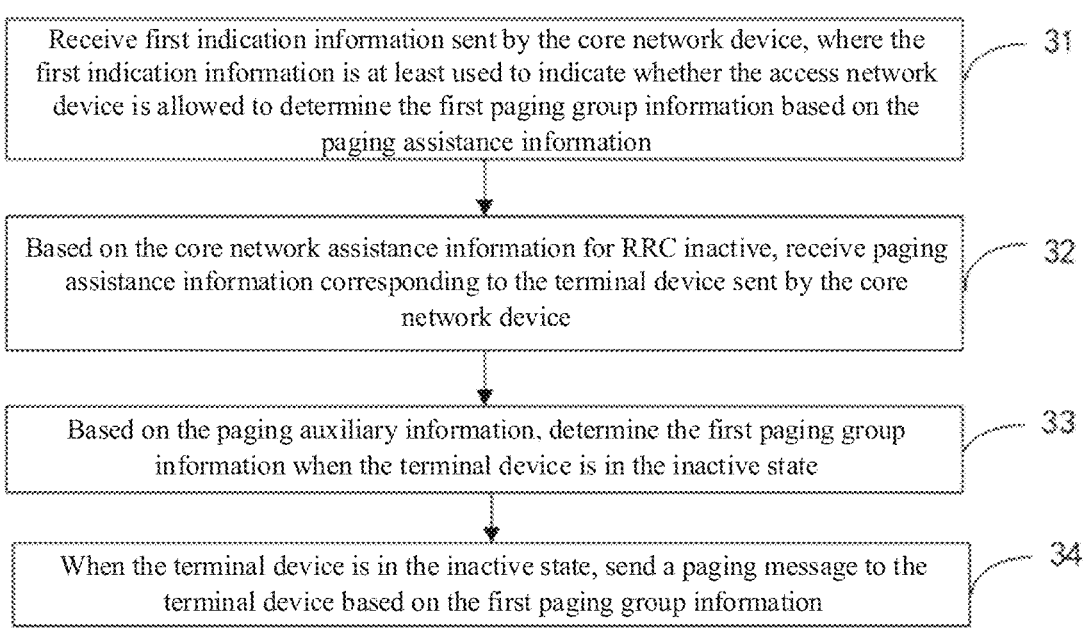

Receive first indication information sent by the core network device, where the first indication information is at least used to indicate whether the access network device is allowed to determine the first paging group information based on the paging assistance information — 31

Based on the core network assistance information for RRC inactive, receive paging assistance information corresponding to the terminal device sent by the core network device — 32

Based on the paging auxiliary information, determine the first paging group information when the terminal device is in the inactive state — 33

When the terminal device is in the inactive state, send a paging message to the terminal device based on the first paging group information — 34

FIG. 3

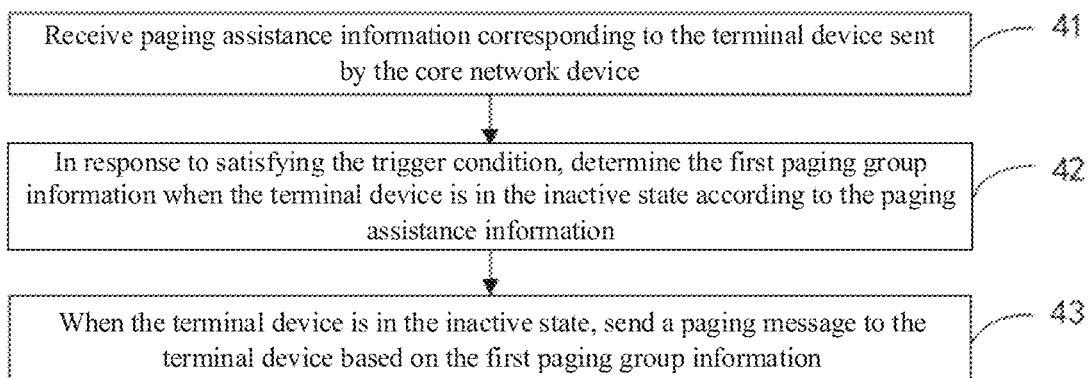

Receive paging assistance information corresponding to the terminal device sent by the core network device — 41

In response to satisfying the trigger condition, determine the first paging group information when the terminal device is in the inactive state according to the paging assistance information — 42

When the terminal device is in the inactive state, send a paging message to the terminal device based on the first paging group information — 43

FIG. 4

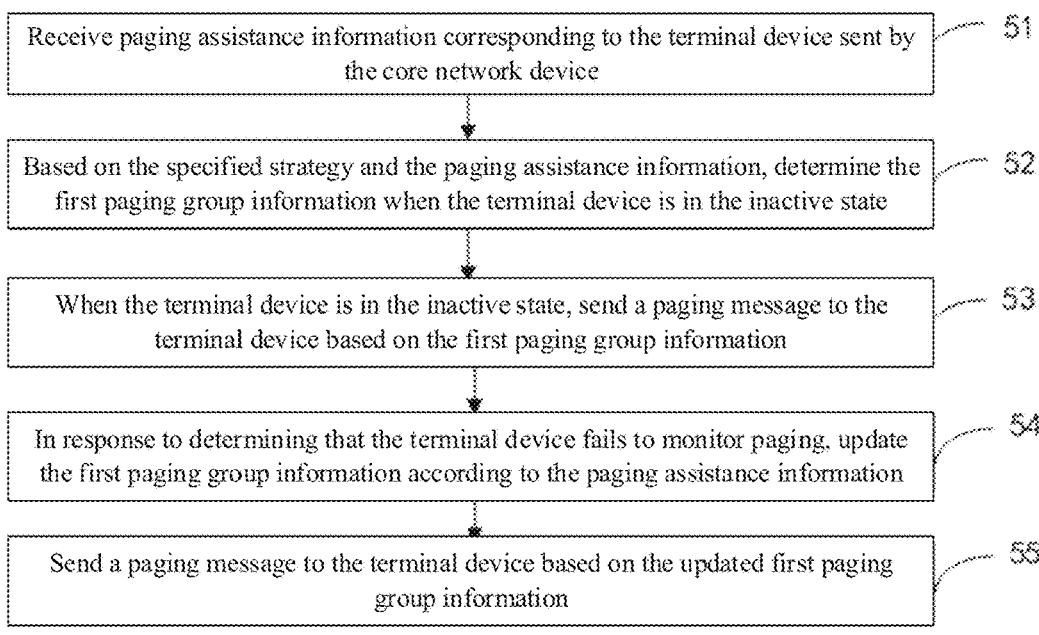

Receive paging assistance information corresponding to the terminal device sent by the core network device — 51

Based on the specified strategy and the paging assistance information, determine the first paging group information when the terminal device is in the inactive state — 52

When the terminal device is in the inactive state, send a paging message to the terminal device based on the first paging group information — 53

In response to determining that the terminal device fails to monitor paging, update the first paging group information according to the paging assistance information — 54

Send a paging message to the terminal device based on the updated first paging group information — 55

FIG. 5

Send paging assistance information corresponding to the terminal device to the access network device, where the paging assistance information is used to assist the access network device in determining the first paging group information when the terminal device is in an inactive state — 61

FIG. 6

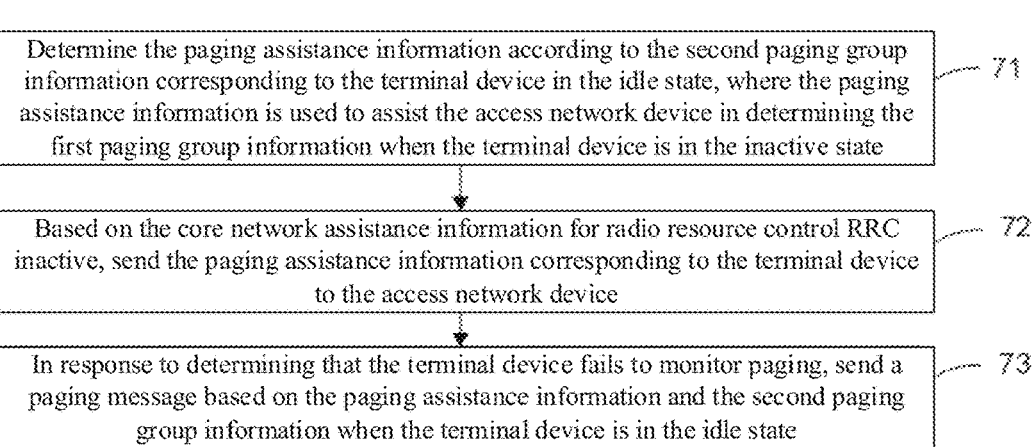

Determine the paging assistance information according to the second paging group information corresponding to the terminal device in the idle state, where the paging assistance information is used to assist the access network device in determining the first paging group information when the terminal device is in the inactive state — 71

Based on the core network assistance information for radio resource control RRC inactive, send the paging assistance information corresponding to the terminal device to the access network device — 72

In response to determining that the terminal device fails to monitor paging, send a paging message based on the paging assistance information and the second paging group information when the terminal device is in the idle state — 73

FIG. 7

PAGING METHOD AND APPARATUS USING SAID METHOD

CROSS REFERENCE

The present application is a U.S. national phase application of International Application No. PCT/CN2021/092873, filed on May 10, 2021, and the entire contents thereof are incorporated herein by reference.

TECHNICAL FIELD

The present disclosure relates to the field of communication technology, and in particular, to a paging method and a device thereof.

BACKGROUND

Generally, in a communication system, for the terminal device in the inactive state, the corresponding paging group information can be allocated by the access network device, and for the terminal device the idle state, the corresponding paging group information can be allocated by the core network device.

SUMMARY

An embodiment of the present disclosure provides a paging method and a device thereof.

In a first aspect, an embodiment of the present disclosure provides a paging method executed by an access network device, and the method includes: receiving paging assistance information corresponding to a terminal device sent by a core network device; and determining, according to the paging assistance information, first paging group information when the terminal device is in an inactive state.

In a second aspect, an embodiment of the present disclosure provides another paging method executed by a core network device, and the method includes: sending, to an access network device, paging assistance information corresponding to a terminal device, wherein the paging assistance information is used for the access network device to determine first paging group information when the terminal device is in an inactive state.

In a third aspect, an embodiment of the present disclosure provides a communication device, which includes a processor, when the process invokes a computer program stored in a memory, the method according to the above first aspect is implemented.

In a fourth aspect, an embodiment of the present disclosure provides a communication device, which includes a processor, when the process invokes a computer program stored in a memory, the method according to the above second aspect is implemented.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

In order to more clearly illustrate the technical solutions in the embodiments of the disclosure or the background technology, the drawings required to be used in the embodiments or the background technology of the disclosure will be described below.

FIG. 3 is a schematic flowchart of a paging method provided by one or more embodiments of the present disclosure;

FIG. 4 is a schematic flowchart of a paging method provided by one or more embodiments of the present disclosure;

FIG. 5 is a schematic flowchart of a paging method provided by one or more embodiments of the present disclosure;

FIG. 6 is a schematic flowchart of a paging method provided by one or more embodiments of the present disclosure;

FIG. 7 is a schematic flowchart of a paging method provided by one or more embodiments of the present disclosure;

DETAILED DESCRIPTION

For ease of understanding, terminology involved in this disclosure is first introduced.

1. Paging Group Information

Generally, in a communication system, for the terminal device in the inactive state, the corresponding paging group information can be allocated by the access network device, and for the terminal device in the idle state, the corresponding paging group information can be allocated by the core network device.

In order to better understand the paging method disclosed in the embodiment of the present disclosure, the communication system to which the embodiment of the present disclosure is applicable is firstly described below.

Figure 1:
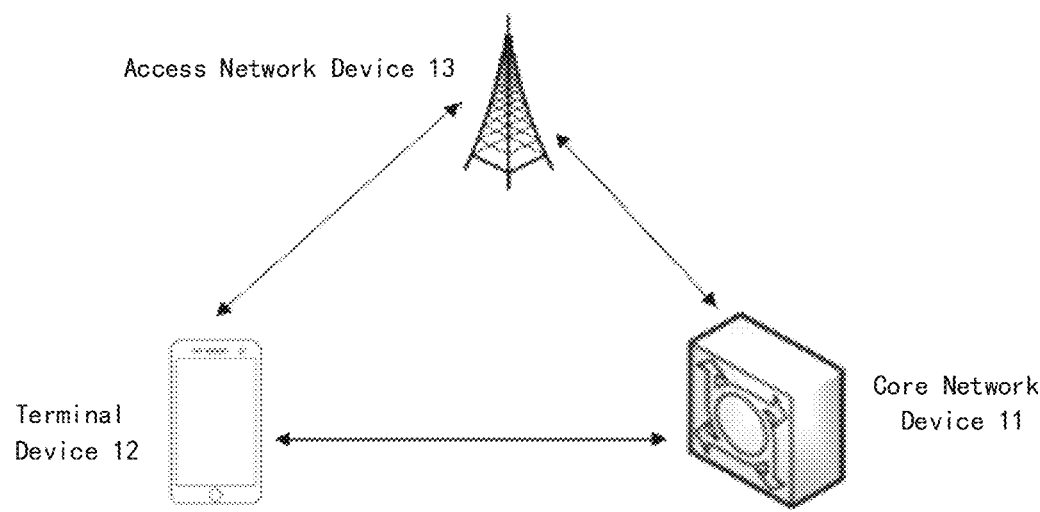
FIG. 1 is a schematic architectural diagram of a communication system provided by an embodiment of the present disclosure.

Please refer to FIG. 1, which is a schematic architectural diagram of a communication system provided by one or more embodiments of the present disclosure. The communication system may include but is not limited to a core network device, an access network device and a terminal device. The number and form of devices shown in FIG. 1 are only for examples and do not constitute a limitation on the embodiments of the present disclosure. In actual applications, it may include two or more core network devices, two or more access network devices, and two or more terminal devices. The communication system shown in FIG. 1 includes a core network device 11, a terminal device 12 and an access network device 13 for example.

It should be noted that the technical solutions of the embodiments of the present disclosure can be applied to various communication systems. For example: long term evolution (LTE) system, fifth generation (5G) mobile communication system, 5G new radio (NR) system, or other future new mobile communication systems.

The access network device 13 in the embodiment of the present disclosure is an entity on the network side that is used to transmit or receive signals. For example, the access network device 13 may be an evolved base station (evolved NodeB, eNB), a transmission reception point (TRP), a next generation base station (next generation NodeB, gNB) in an NR system, or the base station in other future mobile communication systems or access point in a wireless fidelity (WiFi) system.

The embodiments of the present disclosure do not limit the specific technologies and specific equipment forms used by the access network device 13 and the core network device 11. The access network device provided by the embodiments of the present disclosure may include a centralized unit (CU) and a distributed unit (DU). The CU may also be referred to as a control unit. Using the CU-DU structure can separate the protocol layers of access network device, such as the base station, with some protocol layer functions placed under centralized control on the CU, while the remaining part or all protocol layer functions are distributed in the DU, and the DU is centrally controlled by the CU.

In the embodiment of the present disclosure, the terminal device 12 is an entity on the user side for receiving or transmitting signals, such as a mobile phone. The terminal device can also be referred to as terminal device (terminal), user equipment (user equipment, UE), mobile station (mobile station, MS), mobile terminal device (mobile terminal, MT), etc. The terminal device can be cars with communication functions, smart cars, mobile phones, wearable devices, tablets (Pads), computers with wireless transceiver functions, virtual reality (VR) terminal devices, augmented reality (AR) terminal device, wireless terminal device in industrial control, wireless terminal device in self-driving, wireless terminal device in remote medical surgery, wireless terminal device in smart grid, wireless terminal device in transportation safety, wireless terminal device in smart city, wireless terminal device in smart home, etc. The embodiments of the present disclosure do not limit the specific technology and specific equipment form used by the terminal device.

It can be understood that the communication system described in the embodiments of the present disclosure is to more clearly illustrate the technical solutions of the embodiments of the present disclosure, and does not constitute a limitation on the technical solutions provided by the embodiments of the present disclosure. As those of ordinary skill in the art will know, with the evolution of system architecture and the emergence of new service scenarios, the technical solutions provided by the embodiments of the present disclosure are also applicable to similar technical problems.

The paging method and device provided by the present disclosure will be introduced in detail below with reference to the accompanying drawings.

Figure 2:
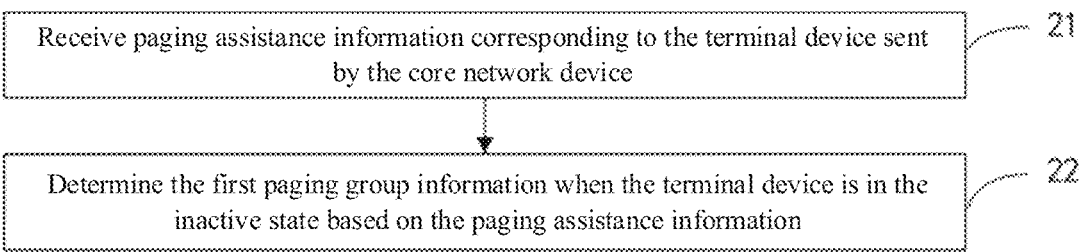
FIG. 2 is a schematic flowchart of a paging method provided by one or more embodiments of the present disclosure.

Please refer to FIG. 2. FIG. 2 is a schematic flowchart of a paging method provided by one or more embodiments of the present disclosure. The method is executed by an access network device. As shown in FIG. 2, the method may include but is not limited to the followings.

Block 21: Receive paging assistance information corresponding to the terminal device sent by the core network device.

In the embodiment, the paging assistance information is used to indicate the paging group information when the terminal device is in the idle state. It can be determined by the core network device according to the protocol, or it can also be determined by the core network device according to the preset rules, etc. It is not limited by this disclosure.

Block 22: Determine the first paging group information when the terminal device is in the inactive state based on the paging assistance information.

In some embodiments, the first paging group information may be any one or more of the following information: paging group set identifier, paging group identifier, paging probability, paging probability indication, and paging cycle.

The paging group set identifier may be the group set identifier where the terminal device is located when it is in the inactive state determined by the access network device.

The paging group identifier may be the group identifier where the terminal device is located when it is in the inactive state determined by the access network device, and the access network device may send a paging message to the terminal device based on the paging group identifier.

The paging probability may be the probability of being paged when the terminal device is in an inactive state determined by the access network device.

The paging probability indication may be a probability indication of the terminal device being paged when it is in an inactive state determined by the access network device. The paging probability indication may include high, medium, or low.

The paging cycle may be an interval between two consecutive paging messages sent to the terminal device when the terminal device is in an inactive state determined by the access network device.

It can be understood that the paging group set identifier, paging group identifier, paging probability, paging probability indication, and the style or presentation of the paging cycle can be configured by protocol or core network device, or determined by other means. For example, the paging group identifier can be group 1, group 2, etc., and the paging probability indication can be high, medium, low, etc. This is not limited by the disclosure.

Generally, for the terminal device in the inactive state, its corresponding paging group information can be allocated by the access network device, and for the terminal device in the idle state, its corresponding paging group information can be allocated by the core network device.

For example, the paging group information allocated by the access network device to the inactive terminal device is group 1, and the paging group information allocated by the core network device to the idle terminal device is group 2. If the context of the terminal device in the inactive state is lost on the network side, the access network device may mistakenly believe that the terminal device is in the idle state, and may use group 2 to page it, while the terminal device may still be using group 1 at this time to monitor, which may cause paging failure.

Therefore, in the embodiment of the present disclosure, in order to improve the paging success rate and reduce the power consumption of the terminal device, the access network device can determine the first paging group information when the terminal device is in the inactive state based on the paging assistance information corresponding to the terminal device sent by the core network device. Afterwards, the paging message can be sent to the terminal device based on the first paging group information. As a result, the access network device and the core network device can maintain a consistent understanding of the first paging group information when the terminal device is in the inactive state, thereby reducing the probability of paging failure and reducing the power consumption of the terminal device.

With the embodiments of the present disclosure, the access network device can determine the first paging group information when the terminal device is in the inactive state based on the paging assistance information after receiving the paging assistance information corresponding to the terminal device sent by the core network device, and perform group paging to the terminal device. As a result, the probability of paging failure and the power consumption of the terminal device are reduced.

Please refer to FIG. 3. FIG. 3 is a schematic flowchart of a paging method provided by one or more embodiments of the present disclosure. The method is executed by an access network device. As shown in FIG. 3, the method may include but is not limited to the followings.

Block 31: Receive first indication information sent by the core network device, where the first indication information is at least used to indicate whether the access network device is allowed to determine the first paging group information based on the paging assistance information.

In all implementations of the present disclosure, the first indication information may indicate explicitly or implicitly whether the access network device is allowed to determine the first paging group information based on the paging assistance information. For example: the first indication information can explicitly indicate whether the access network device is allowed to determine the first paging group information based on the paging assistance information; that is, the first indication information includes a field, and the field is used to indicate whether the access network device is allowed to determine the first paging group information based on the paging assistance information. The length and indication form of the field may be agreed upon by the protocol, configured by the core network device, or determined by other methods, and this disclosure does not limit this. For another example, the first indication information may implicitly indicate whether the access network device is allowed to determine the first paging group information based on the paging assistance information; that is, it may be indicated by the encoding method, length, etc. of the first indication information.

For example, according to the protocol or the configuration of the core network device: when the field is XX, it represents that the access network device can determine the first paging group information based on the paging assistance information; and when the field is YY, it represents that the access network device cannot determine the first paging group information based on the paging assistance information. Accordingly, if the field contained in the first indication information received by the access network device is: XX, the access network device can determine the first paging group information of the terminal device in the inactive state based on the paging assistance information, etc., which is not limited by this disclosure.

Block 32: Based on the core network assistance information for RRC inactive, receive paging assistance information corresponding to the terminal device sent by the core network device.

In the embodiment, radio resource control (RRC) can also be called radio resource management (RRM) or radio resource allocation (RRA).

In some embodiments, in this disclosure, the core network assistance information for RRC inactive can be configured according to the protocol or the configuration of the core network device, so that it can carry instruction information.

For example, a specified bit can be added to the core network assistance information for RRC inactive, and the paging assistance information corresponding to the terminal device can be represented by specifying the bit value. Therefore, after receiving the core network assistance information for RRC inactive, the access network device can determine, based on the value of the specified bit, the paging assistance information corresponding to the terminal device sent by the core network device, etc., which is not limited by this disclosure.

It should be noted that block 31 can be performed first, and then block 32 can be performed, or block 32 can be performed first, and then block 31 can be performed, etc. This disclosure does not limit this.

Block 33: Based on the paging assistance information, determine the first paging group information when the terminal device is in the inactive state.

In some embodiments, the first paging group information may be any one or more of the following information: paging group set identifier, paging group identifier, paging probability, paging probability indication, and paging cycle.

It should be noted that for the specific content and implementation of the paging group set identifier, paging group identifier, paging probability, paging probability indication, and paging cycle, please refer to the descriptions of other embodiments of the present disclosure, and will not be repeated here.

In some embodiments, the paging assistance information may include a group range to which the paging group in the first paging group information belongs.

The grouping range may include one grouping, or may include multiple groups, etc. This disclosure does not limit this.

It can be understood that, after receiving the paging assistance information sent by the core network device, the access network device can determine the first paging group information when the terminal device is in the inactive state based on the paging assistance information. One embodiment is that the access network device can select a group from the group range to which the paging group belongs given by the core network device as the final result.

For example, the group range to which the paging group in the first paging group information belongs included in the paging assistance information is: group 1 to group 3. Then, after receiving the paging assistance information sent by the core network device, the access network device can determine, based on the paging assistance information, that the group range to which the paging group in the first paging group information belongs when the terminal device is in the inactive state is group 1 to group 3. For example, group 1 is selected therefrom as the first paging group information when the terminal device is in the inactive state. This disclosure does not limit this.

In some embodiments, the paging assistance information may include a group set range to which the paging group in the first paging group information belongs.

In the embodiment, the group set range may include one group set, or may include multiple group sets, etc., this disclosure does not limit this.

For example, the group set range to which the paging group in the first paging group information belongs included in the paging assistance information is: group set 1 to group set 3. Then, after receiving the paging assistance information corresponding to the terminal device sent by the core network device, the access network device can determine, based on the paging assistance information, that the group set range to which the paging group in the first paging group information belongs when the terminal device is in the inactive state is group set 1 to group set 3. For example, group set 1 is selected therefrom as the first paging group information when the terminal device is in the inactive state. This disclosure does not limit this.

In some embodiments, the paging assistance information may include a group list to which the paging group of the first paging group information belongs.

For example, the group list to which the paging group in the first paging group information belongs included in the paging assistance information is: group 1, group 2 and group 3. Then, after receiving the paging assistance information corresponding to the terminal device sent by the core network device, the access network device determines, based on the paging assistance information, that the group list to which the paging group in the first paging group information belongs when the terminal device is in the inactive state is group 1, group 2 and group 3, and group 1 is selected therefrom as the first paging group information when the terminal device is in the inactive state, etc., which is not limited by this disclosure.

In some embodiments, the paging assistance information may include a group set list to which the paging group of the first paging group information belongs.

For example, the group set list to which the paging group in the first paging group information belongs included in the paging assistance information is: group set 1, group set 2 and group set 3. Then, after receiving the paging assistance information corresponding to the terminal device sent by the core network device, the access network device determines, based on the paging assistance information, that the group set list to which the paging group in the first paging group information belongs when the terminal device is in the inactive state is group set 1, group set 2 and group set 3, and group set 1 is selected therefrom as the first paging group information when the terminal device is in the inactive state, etc., which is not limited by this disclosure.

In some embodiments, the paging assistance information may include a group identifier corresponding to the paging group of the first paging group information.

In the embodiment, the style or presentation form of the group identifier can be determined by the protocol or configured by the core network device, for example, it can be 1, 2, etc., and this disclosure does not limit this.

For example, the group identifier corresponding to the paging group of the first paging group information included in the paging assistance information is: identification (id) 1. Then, after receiving the paging assistance information corresponding to the terminal device sent by the core network device, the access network device can determine, based on the paging assistance information, that the group identifier corresponding to the paging group of the first paging group information when the terminal device is in the inactive state is: id 1. This disclosure does not limit this.

In some embodiments, the paging assistance information may include a group list identifier corresponding to the paging group of the first paging group information.

In the embodiment, the style or presentation form of the grouping list identifier can be determined by the protocol or configured by the core network device, for example, it can be list 1, list 2 and so on, this disclosure does not limit this.

For example, the group list identifier corresponding to the paging group of the first paging group information included in the paging assistance information is: list 1. Then, after receiving the paging assistance information corresponding to the terminal device sent by the core network device, the access network device can determine, based on the paging assistance information, that the group list identifier corresponding to the paging group of the first paging group information when the terminal device is in the inactive state is: list 1. This disclosure does not limit this.

In some embodiments, the paging assistance information may include a probability range to which the paging probability in the first paging group information belongs.

One embodiment is that after receiving the paging assistance information corresponding to the terminal device sent by the core network device, the access network device can select, based on the paging probability range, one paging probability from the paging probability range as the paging probability in the first paging group information when the terminal device is in the inactive state, and assign the paging probability to the terminal device.

For example, the probability range to which the paging probability of the first paging group information belongs included in the paging assistance information is: 0.6 to 0.8. Then, after receiving the paging assistance information corresponding to the terminal device sent by the core network device, the access network device can determine, based on the paging assistance information, that the probability range to which the paging probability in the first paging group information belongs when the terminal device is in the inactive state is: 0.6 to 0.8, and select therefrom 0.7 to assign to the terminal device, etc., which is not limited by this disclosure.

In some embodiments, the paging assistance information may include a probability range identifier to which the paging probability in the first paging group information belongs.

The style or presentation form of the probability range identifier can be determined by the protocol or configured by the core network device, for example, it can be W, X, etc. This disclosure does not limit this.

For example, the probability range identifier to which the paging probability in the first paging group information belongs included in the paging assistance information is: W. Then, after receiving the paging assistance information corresponding to the terminal device sent by the core network device, the access network device can determine, based on the paging assistance information, that the probability range identifier to which the paging probability in the first paging group information belongs when the terminal device is in the inactive state is: W. This disclosure does not limit this.

In some embodiments, the paging assistance information may include a probability list to which the paging probability in the first paging group information belongs. For example, the probability list to which the paging probability in the first paging group information belongs included in the paging assistance information is: 0.5, 0.6 and 0.8. Then, after receiving the paging assistance information corresponding to the terminal device sent by the core network device, the access network device can determine, based on the paging assistance information, that the probability list to which the paging probability in the first paging group information belongs when the terminal device is in the inactive state is: 0.5, 0.6 and 0.8, and select therefrom 0.6 to assign to the terminal device. This disclosure does not limit this.

In some embodiments, the paging assistance information may include a probability list identifier to which the paging probability in the first paging group information belongs.

The style or presentation form of the probability list identifier can be determined by the protocol or configured by the core network device, for example, it can be list W, list X and so on, this disclosure does not limit this.

For example, the probability list identifier to which the paging probability in the first paging group information belongs included in the paging assistance information is: list W and list X. Then, after receiving the paging assistance information corresponding to the terminal device sent by the core network device, the access network device can determine, based on the paging assistance information, that the probability list identifier to which the paging probability in the first paging group information belongs when the terminal device is in the inactive state is: list W and list X, and select therefrom list X as the first paging group information when the terminal device is in the inactive state, etc., which is not limited by this disclosure.

In some embodiments, the paging assistance information may include second paging group information when the terminal device is in the idle state.

The second paging group information may be the group set when the terminal device is in the idle state, or may be the group identifier when the terminal device is in the idle state, or it may also be the group probability when the terminal device is in the idle state, etc., which is not limited by this disclosure.

Accordingly, after receiving the paging assistance information corresponding to the terminal device sent by the core network device, the access network device can, based on the second paging group information of the terminal device in the idle state included in the paging assistance information, determine the first paging group information when the terminal device is in the inactive state, etc., which is not limited by this disclosure. That is, the second paging group information when the terminal device is in the idle state included in the paging assistance information is a type of paging assistance information provided by the core network device, and the access network device uses this to determine the first paging group information when the terminal device is in the inactive state.

In some embodiments, the paging assistance information may include an offset between the paging group identifier in the first paging group information and the paging group identifier in the second paging group information in the idle state.

In the embodiment, the offset can be a positive value, a negative value, or zero, etc., For example, the offset between the paging group identifier in the first paging group information and the paging group identifier in the second paging group information in the idle state included in the paging assistance information is: +1. Then, after receiving the paging assistance information corresponding to the terminal device sent by the core network device, the access network device can determine, based on the paging assistance information, that the paging group identifier in the first paging group information when the terminal device is in the inactive state equals to the paging group identifier in the second paging group information in the idle state+1. This disclosure does not limit this.

For example, based on the paging assistance information, it is determined that the paging group identifier in the first paging group information when the terminal device is in the inactive state is the paging group identifier in the second paging group information when the terminal device is in the idle state, that is, it is continued to use the paging group identifier in the second paging group information allocated by the core network device for the idle state. At this time, the access network device no longer allocates the paging group identifier for the inactive state.

In some embodiments, the paging assistance information may include an offset between the set identifier to which the paging group in the first paging group information belongs and the set identifier to which the paging group in the second paging group information in the idle state belongs.

In the embodiment, the offset can be a positive value, a negative value, or zero, etc.

For example, the offset between the set identifier to which the paging group in the first paging group information belongs and the set identifier to which the paging group in the second paging group information in the idle state belongs included in the paging assistance information is: −1. Then, after receiving the paging assistance information corresponding to the terminal device sent by the core network device, the access network device can determine, based on the paging assistance information, that the set identifier to which the paging group in the first paging group information when the terminal device is in the inactive state belongs equals to the set identifier to which the paging group in the second paging group information in the idle state belongs+1. This disclosure does not limit this.

In some embodiments, the paging assistance information may include whether the paging group in the first paging group information and the paging group in the second paging group information in the idle state belong to the same group set.

For example, the paging assistance information includes: the paging group in the first paging group information and the paging group in the second paging group information in the idle state belong to the same group set. Then, after receiving the paging assistance information corresponding to the terminal device sent by the core network device, the access network device can determine, based on the paging assistance information, that the paging group in the first paging group information when the terminal device is in the inactive state and the paging group in the second paging group information in the idle state belong to the same group set.

For example, the paging group in the second paging group information in the idle state belongs to group set 1, which includes group 1 and group 2. Then, the access network device may determine that the paging group in the first paging group information when the terminal device is in the inactive state may be group 1 or group 2, etc., which is not limited by this disclosure.

It can be understood that the paging assistance information may include one or more of the above contents, etc., and this disclosure is not limited thereto.

Block 34: When the terminal device is in the inactive state, send a paging message to the terminal device based on the first paging group information.

For example, the first paging group information determined by the access network device when the terminal device is in the inactive state is: group 1, then the access network device can send a paging message to the terminal device based on group 1 when the terminal device is in the inactive state. Therefore, the probability of paging failure and the power consumption of the terminal device are reduced.

For example, as mentioned in the background section, if the context of the terminal device in the inactive state is lost on the network side, the access network device may mistakenly believe that the terminal device is in the idle state, and thus may paging the terminal device using the second paging group information in the idle state, while the terminal device may still use the first paging group information in the inactive state for monitoring, which may cause paging failure.

However, because the first paging group information in the inactive state is obtained based on the second paging group information in the idle state, the access network device can, after firstly fail to paging based on the first paging group information in the inactive state, expend the paging range using the paging assistance information provided by the core network, and subsequently may still successfully paging the terminal device. From this point of view, the paging assistance information provided by the core network device provides a wider range of the first paging group information. For example, the paging assistance information provided by the core network device provides a set of group ids of the first paging group information, such as group 1 to 3. The final choice of access network device is group 1, the situation where the terminal loses paging mentioned above will occur. However, after the access network device does not receive the paging response, the range can be expanded, and the paging may be performed again in the group 2 and group 3, and the terminal device will not lose the paging message.

By implementing the embodiments of the present disclosure, the access network device can firstly receive the first instruction information sent by the core network device, and can also receive the paging assistance information corresponding to the terminal device sent by the core network device based on core network assistance information for RRC inactive. Afterwards, the first paging group information when the terminal device is in the inactive state can be determined, and when the terminal device is in the inactive state, a paging message can be sent to the terminal device based on the first paging group information. Thus, the probability of paging failure and the power consumption of the terminal device are reduced.

Please refer to FIG. 4. FIG. 4 is a schematic flowchart of a paging method provided by one or more embodiments of the present disclosure. The method is executed by an access network device. As shown in FIG. 4, the method may include but is not limited to the followings.

Block 41: Receive paging assistance information corresponding to the terminal device sent by the core network device.

It should be noted that, for the specific content and implementation manner of block 41, reference can be made to the descriptions of other embodiments of the present disclosure, and will not be described again here.

Block 42. In response to satisfying the triggering condition, determine the first paging group information when the terminal device is in the inactive state according to the paging assistance information.

In some embodiments, the first paging group information may be any one or more of the following information: paging group set identifier, paging group identifier, paging probability, paging probability indication, and paging cycle.

It should be noted that for the specific content and implementation of the paging group set identifier, paging group identifier, paging probability, paging probability indication, paging cycle, etc., please refer to the descriptions of other embodiments of the present disclosure, details will not be repeated here.

In some embodiments, the access network device can determine the triggering conditions based on the protocol.

For example, the protocol agrees that the triggering condition is A. Then, if A is satisfied, the access network device can determine the first paging group information when the terminal device is in the inactive state according to the paging assistance information, etc., which is not limited by this disclosure.

In some embodiments, the triggering condition may also be indicated by the core network device to the access network device. That is, in this disclosure, the access network device may also firstly receive the second indication information sent by the core network device, and then determine the triggering condition based on the second indication information.

The second indication information is used to instruct the triggering condition to the access network device for determining the first paging group information based on the paging assistance information.

For example, after the access network device receives the second indication information sent by the core network device, it determines based on the indication of the second indication information that the triggering condition is: A. Then, if A is satisfied, the access network device can determine the first paging group information when the terminal device is in the inactive state according to the paging assistance information, etc., which is not limited by this disclosure.

In this disclosure, the execution order of the above blocks 41 and 42 is not limited.

Block 43: When the terminal device is in the inactive state, send a paging message to the terminal device based on the first paging group information.

It should be noted that for the specific content and implementation manner of block 43, reference can be made to the descriptions of other embodiments of the present disclosure, and will not be described again here.

By implementing the embodiments of the present disclosure, the access network device can firstly receive the paging assistance information corresponding to the terminal device sent by the core network device, and then, if the triggering condition is met, it can determine based on the paging assistance information the first paging group information of the terminal device in the inactive state. When the terminal device is in the inactive state, based on the first paging group information, it sends a paging message to the terminal device. As a result, the probability of paging failure and the power consumption of the terminal device are reduced.

Please refer to FIG. 5. FIG. 5 is a schematic flowchart of a paging method provided by one or more embodiments of the present disclosure. The method is executed by an access network device. As shown in FIG. 5, the method may include but is not limited to the followings.

Block 51: Receive paging assistance information corresponding to the terminal device sent by the core network device.

It should be noted that the specific content and implementation manner of block 51 may refer to the descriptions of other embodiments of the present disclosure, and will not be described again here.

Block 52: Based on the specified strategy and the paging assistance information, determine the first paging group information when the terminal device is in the inactive state.

In some embodiments, the first paging group information may be any one or more of the following information: paging group set identifier, paging group identifier, paging probability, paging probability indication, and paging cycle.

It should be noted that the specific contents and implementation methods of the paging group set identifier, paging group identifier, paging probability, paging probability indication, paging cycle, etc., can be referred to the descriptions of other embodiments of the present disclosure, which are not discussed here again.

In some embodiments, the access network device can determine the specified strategy based on the protocol.

For example, the protocol agrees that the specified strategy is: the first paging group information of the terminal device in the inactive state can be obtained from the second paging group information of the terminal device in the idle state by offsetting Z. Then the access network device can firstly determine the second paging group information when the terminal device is in the idle state based on the paging assistance information, and then determine the first paging group information when the terminal device is in the inactive state based on the protocol. This disclosure does not limit this.

In some embodiments, the access network device may also determine the specified strategy based on the third indication information of the core network device.

In the embodiment, the third indication information is used to instruct the strategy to the access network device for determining the first paging group information based on the paging assistance information.

For example, after the access network device receives the third indication information sent by the core network device, according to the indication of the third indication information, the determined strategy is: the paging grouping when the terminal device is in the inactive state and the paging grouping when the terminal device is in the idle state belong to the same paging group set. Then, the access network device can determine the first paging group information when the terminal device is in the inactive state according to the strategy and the paging assistance information. This disclosure does not limit this.

It should be noted that the above examples of the specified strategy are only schematic illustrations. The specific implementation of the specified strategy can be set as needed, and this disclosure does not limit this.

Block 53: When the terminal device is in the inactive state, send a paging message to the terminal device based on the first paging group information.

It should be noted that, for the specific content and implementation manner of block 53, reference can be made to the descriptions of other embodiments of the present disclosure, and will not be described again here.

Block 54: In response to determining that the terminal device fails to monitor paging, update the first paging group information according to the paging assistance information.

Block 55: Send a paging message to the terminal device based on the updated first paging group information.

For example, the access network device determines, according to the specified strategy, that the paging group in the first paging group information and the paging group in the second paging group information in the idle state belong to the same group set. Also, the paging assistance information indicates that the paging group in the second paging group information when the terminal device is in the idle state belongs to the group set 1, which includes group 1, group 2 and group 3. If the access network device determines that the paging group when the terminal device is in the inactive state is group 1, and after sending a paging message to the terminal device according to group 1, it is determined that the terminal device has failed in paging monitoring. After that, the first paging group information can be updated based on the paging assistance information and the specified strategy. For example, it is determined that the paging group in the first paging group information is group 2, and a paging message is sent to the terminal device based on group 2. And so on, until it is determined that the terminal device paging monitoring is successful. This disclosure does not limit this.

For example, the access network device determines, according to the specified strategy, that the paging group in the first paging group information and the paging group in the second paging group information in the idle state belong to the same group set.

As an embodiment, the core network device provides the group probability when allocating paging assistance information to the access network device. Then the access network device allocates the first paging grouping information to the inactive user and can limit that the group probability is determined within the corresponding probability range in the same group set.

For example, take the probability grouping method as an example, the probability given in the paging assistance information sent by the core network device is 50%, which corresponds to group set 2. The corresponding probability range of group set 2 is 40% to 70%. Then the access network device allocates paging assistance information to the inactive terminal device, and can limit the group probability to not exceed the probability range corresponding to group set 2.

It should be noted that the above examples are only illustrative and cannot be used as a limitation on the paging assistance information, respective group set, the probability value and the corresponding relationship therebetween in the embodiment of the present disclosure.

By implementing the embodiments of the present disclosure, the access network device can receive the paging assistance information corresponding to the terminal device sent by the core network device, and then can determine, according to the paging assistance information, the first paging group information when the terminal device is in the inactive state based on the specified strategy. When the terminal device is in the inactive state, a paging message is sent to the terminal device based on the first paging group information, and in response to determining that the terminal device fails to monitor paging, update the first paging group information according to the paging assistance information, and based on the updated first paging group information, send a paging message to the terminal device. Thus, the probability of paging failure and the power consumption of the terminal device are reduced.

Please refer to FIG. 6. FIG. 6 is a schematic flowchart of a paging method provided by an embodiment of the present disclosure. The method is executed by a core network device. As shown in FIG. 6, the method may include but is not limited to the followings.

Block 61: Send paging assistance information corresponding to the terminal device to the access network device, where the paging assistance information is used to assist the access network device in determining the first paging group information when the terminal device is in an inactive state.

In some embodiments, the paging assistance information may include at least one of the following: a group range to which a paging group in the first paging group information belongs; a group set range to which the paging group in the first paging group information belongs; a group list to which the paging group of the first paging group information belongs; a group identifier corresponding to the paging group of the first paging group information; a group list identifier corresponding to the paging group of the first paging group information; a probability range to which the paging probability in the first paging group information belongs; a probability range identifier to which the paging probability in the first paging group information belongs; a probability list to which the paging probability in the first paging group information belongs; a probability list identifier to which the paging probability in the first paging group information belongs; second paging group information when the terminal device is in an idle state; an offset between the paging group identification in the first paging group information and the paging group identification in the second paging group information in the idle state; an offset between the set identifier to which the paging group in the first paging group information belongs and the set identifier to which the paging group in the second paging group information in the idle state belongs; and, whether the paging group in the first paging group information belongs to a same group set with the paging group in the second paging group information in the idle state.

It should be noted that, for the specific content and implementation manner of the paging assistance information, reference can be made to the descriptions of other embodiments of the present disclosure, and will not be described again here.

In the embodiment of the present disclosure, the core network device may send the paging assistance information corresponding to the terminal device to the access network device to assist the access network device to determine the first paging group information of the terminal device when it is in the inactive state based on the paging assistance information, so that the access network device and the core network device can maintain a consistent understanding of the first paging group information of the terminal device, and the accuracy of the determined first paging group information is improved, thereby reducing the probability of paging failure, and also reducing the power consumption of terminal device.

By implementing the embodiments of the present disclosure, the core network device can send the paging assistance information corresponding to the terminal device to the access network device, so as to assist the access network device to determine the first paging group information when the terminal device is in the inactive state based on the paging assistance information. As a result, the probability of paging failure is reduced, and the power consumption of the terminal device is also reduced.

Please refer to FIG. 7. FIG. 7 is a schematic flowchart of a paging method provided by an embodiment of the present disclosure. The method is executed by a core network device. As shown in FIG. 7, the method may include but is not limited to the followings.

Block 71. Determine the paging assistance information according to the second paging group information corresponding to the terminal device in the idle state, where the paging assistance information is used to assist the access network device in determining the first paging group information when the terminal device is in the inactive state.

It should be noted that, for the specific content and implementation of the second paging group information corresponding to the terminal device in the idle state and the paging assistance information, please refer to the descriptions of other embodiments of the present disclosure, and will not be described again here.

Block 72: Based on the core network assistance information for radio resource control RRC inactive, send the paging assistance information corresponding to the terminal device to the access network device.

In some embodiments, in this disclosure, the core network assistance information for RRC inactive can be configured according to the protocol or the configuration of the core network device, so that it can carry the indication information.

For example, the core network device can add a specified bit to the core network assistance information for RRC inactive, and represent the paging assistance information corresponding to the terminal device by specifying the value of the bit. This disclosure does not limit this.

Block 73: In response to determining that the terminal device fails to monitor paging, send a paging message based on the paging assistance information and the second paging group information when the terminal device is in the idle state.

For example, the core network device determines that the terminal device fails to monitor paging according to group 1. Also, the paging assistance information indicates that the paging group in the first paging group information and the paging group in the second paging group information in the idle state belong to the same group set, and the paging group in the second paging group information of the terminal device in the idle state belongs to the group set 1, which includes group 1, group 2 and group 3. Then the core network device can send a paging message to the terminal device based on the paging assistance information. For example, determine that the paging group in the first paging group information is group 2, and send a paging message to the terminal device based on group 2, and so on, until it is determined that paging monitoring of the terminal device is successful. This disclosure does not limit this.

By implementing the embodiments of the present disclosure, the core network device can determine the paging assistance information based on the second paging group information corresponding to the terminal device in the idle state, and then can send to the access network device the paging assistance information corresponding to the terminal device based on the core network assistance information for RRC inactive. When the terminal device fails to monitor paging, the paging message can be sent based on the paging assistance information and the second paging group information when the terminal device is in the idle state. As a result, the probability of paging failure is reduced, and the power consumption of the terminal device is also reduced.

Figure 8:
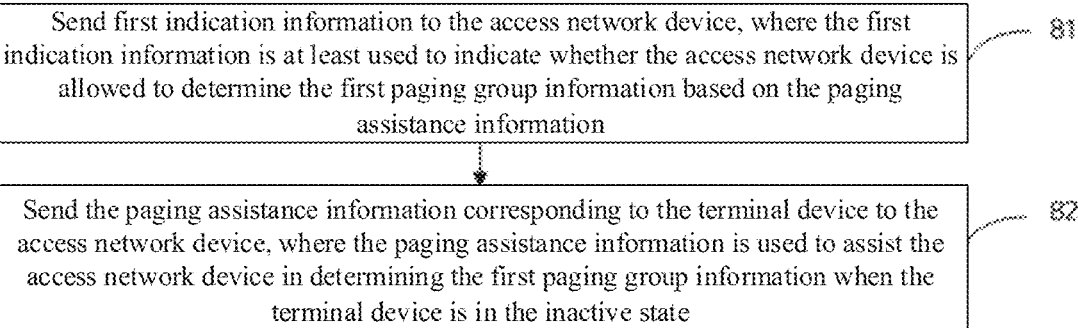
FIG. 8 is a schematic flowchart of a paging method provided by one or more embodiments of the present disclosure.

Please refer to FIG. 8. FIG. 8 is a schematic flowchart of a paging method provided by an embodiment of the present disclosure. The method is executed by a core network device. As shown in FIG. 8, the method may include but is not limited to the followings.

Block 81: Send first indication information to the access network device, where the first indication information is at least used to indicate whether the access network device is allowed to determine the first paging group information based on the paging assistance information.

It should be noted that, for the specific contents and implementation methods of the first indication information and paging assistance information, reference can be made to the descriptions of other embodiments of the present disclosure, and will not be described again here.

In this embodiment of the present disclosure, the core network device may send the first instruction information to the access network device, so that the access network device can learn whether the first paging group information can be determined based on the paging assistance information according to the instruction of the first instruction information. Therefore, the access network device and the core network device can maintain a consistent understanding of the first paging group information when the terminal device is in the inactive state, thereby reducing the probability of paging failure and reducing the power consumption of the terminal device.

In some embodiments, the core network device may also send second indication information to the access network device, where the second indication information is used to instruct the access network device the triggering condition for the access network device to determine the first paging group information based on the paging assistance information.

In the embodiment of the present disclosure, the core network device may send the second instruction information to the access network device, so that the access network device can determine, according to the instruction of the second instruction information, the triggering condition for the access network device to determine the first paging group information based on the paging assistance information. Therefore, the access network device and the core network device can maintain a consistent understanding of the first paging group information when the terminal device is in the inactive state, thereby reducing the probability of paging failure and reducing the power consumption of the terminal device.

In some embodiments, the core network device may also send third indication information to the access network device, where the third indication information is used to instruct the access network device the strategy for the access network device to determine the first paging group information based on the paging assistance information.

In the embodiment of the present disclosure, the core network device may send the third instruction information to the access network device, so that the access network device can determine, according to the instruction of the third instruction information, the strategy for the access network device to determine the first paging group information based on the paging assistance information. Therefore, the access network device and the core network device can maintain a consistent understanding of the first paging group information when the terminal device is in the inactive state, thereby reducing the probability of paging failure and reducing the power consumption of the terminal device.

Block 82: Send the paging assistance information corresponding to the terminal device to the access network device, where the paging assistance information is used to assist the access network device in determining the first paging group information when the terminal device is in the inactive state.

It should be noted that, for the specific content and implementation manner of the paging assistance information, reference can be made to the descriptions of other embodiments of the present disclosure, and will not be described again here.

It should be noted that in the embodiment of the present disclosure, block 81 can be performed first, and then block 82 can be performed, or block 82 can be performed first, and then block 81 can be performed, or block 81 and block 82 can also be performed simultaneously. etc., which is not limited by this disclosure.

By implementing the embodiments of the present disclosure, the core network device can send the first instruction information to the access network device to indicate whether the access network device is allowed to determine the first paging group information based on the paging assistance information, and can also send the paging assistance information corresponding to the terminal device to the access network device, to assist the access network device in determining the first paging group information when the terminal device is in the inactive state. As a result, the probability of paging failure is reduced, and the power consumption of the terminal device is also reduced.

It can be seen from the above analysis that in the present disclosure, the access network device can firstly receive the paging assistance information corresponding to the terminal device sent by the core network device, and then allocate the first paging group information to the inactive terminal device according to the paging assistance information provided by the core network device.

In some embodiments, the first paging group information allocated by the access network device to the inactive terminal device is based on the paging assistance information provided by the core network device.

As an embodiment, the first paging group information allocated by the access network device to the inactive terminal device may be a specifically allocated grouping id.

As an embodiment, the first paging group information allocated by the access network device to the inactive terminal device may be the paging probability provided by the core network device.

As an embodiment, the first paging group information allocated by the access network device to the inactive terminal device is a paging probability indication provided by the core network device, for example, it can be high, medium, low, etc., which is not limited by the present disclosure.

In some embodiments, in the paging assistance information provided by the core network device, a range may be limited for the access network device to allocate the first paging group information to the inactive terminal device.

As an embodiment, in the paging assistance information provided by the core network device, when the access network device allocates the first paging group information to the inactive terminal device, the range of groups allowed to be allocated can be limited.

As an embodiment, in the paging assistance information provided by the core network device, when the access network device allocates the first paging group information to the inactive terminal device, the group list allowed to be allocated can be limited, for example, it can be group ID 1 to 4, etc., which is not limited by this disclosure.

As an embodiment, in the paging assistance information provided by the core network device, when the access network device allocates the first paging group information to the inactive terminal device, it can limit a certain group set or group set list that is allowed to be allocated, for example, it can be group set 1 and group set 2 and so on, this disclosure does not limit this.

As an embodiment, in the paging assistance information provided by the core network device, when the access network device allocates the first paging group information to the inactive terminal device, the probability range that is allowed to be allocated can be limited. For example, the probability range can be 60% to 80%, etc., which is not limited by this disclosure.

As an embodiment, in the paging assistance information provided by the core network device, when the access network device allocates the first paging group information to the inactive terminal device, the probability list of the allowed allocation can be limited, for example, it can be 60%, 70%, 80%, etc., which is not limited by this disclosure.

In some embodiments, when limiting the range for the access network device to allocate the first paging group information to the inactive terminal device in the paging assistance information provided by the core network device, it can be derived from the second paging group information allocated by the core network device to the idle terminal device. For example, the paging assistance information provided by the core network device to the access network device is the second paging group information allocated for the idle terminal device. Based on this, the access network device can provide the first paging group information for the inactive terminal device.

As an embodiment, the second paging group information allocated by the core network device to the idle state terminal device provides the group set.

As an embodiment, the second paging group information allocated by the core network device to the idle state terminal device provides the group id allocated by the core network device to the idle state terminal device.

As an embodiment, the second paging group information allocated by the core network device to the idle state terminal device provides the group probability.

In some embodiments, the paging assistance information provided by the core network device can be notified to the access network device in the form of an interactive message between the access network device and the core network device.

As an embodiment, the paging group information provided by the core network device will be carried in core network assistance information for RRC inactive.

As an embodiment, the paging group information provided by the core network device may also carry a switch to indicate whether the access network device is allowed to allocate the first paging group information to the terminal device in the inactive state based on the paging assistance information provided by the core network device.

In some embodiments, the access network device may allocate the first paging group information to the inactive terminal device based on the paging assistance information provided by the core network device, and notify the terminal device.

As an embodiment, it is an optional function for the access network device to allocate the first paging group information to the inactive terminal device based on the paging assistance information provided by the core network device; whether this function is enabled can be based on the protocol, or configuration of the access network device, or the instruction information obtained by the access network device from the core network device, etc., which is not limited by the present disclosure.

As an embodiment, the allocation strategy for the access network device to allocate the first paging group information to the inactive terminal device based on the paging assistance information provided by the core network device can be based on the protocol, or configuration of the access network device, or the instruction information obtained by the access network device from the core network device, or the like. For example, the first paging group information of the inactive terminal device can be further allocated based on the second paging group information of the idle state, or adding a formula offset to the second paging group information, etc., which is not limited by the present disclosure.

As an embodiment, if the access network device can allocate the first paging group information to the inactive terminal device based on the paging assistance information provided by the core network device, and in the paging assistance information provided by the core network device, it can limit the group list that is allowed to be allocated when the access network device allocates the first paging group information to the inactive terminal device, e.g., it can be group id 1 to 4, then the access network device can select a group id therefrom and assign the group id to the inactive terminal device.

As an embodiment, if the access network device can allocate the first paging group information to the inactive terminal device based on the paging assistance information provided by the core network device, and in the paging assistance information provided by the core network device, it can limit the group set that is allowed to be allocated when the access network device allocates the first paging group information to the inactive terminal device, then the access network device can select a group id from the group set and assign the group id to the inactive terminal device.

As an embodiment, if the access network device can allocate the first paging group information to the inactive terminal device based on the paging assistance information provided by the core network device, and in the paging assistance information provided by the core network device, the group set of the second paging group information allocated by the core network device to the idle terminal device is provided, and the first paging group information allocated by the access network device to the inactive terminal device is limited in the same group set, then the access network device can select a group id from the group set and assign the group id to the inactive terminal device.

As an embodiment, if the access network device can allocate the first paging group information to the inactive terminal device based on the paging assistance information provided by the core network device, and in the paging assistance information provided by the core network device, the group id of the second paging group information allocated by the core network device to the idle terminal device is provided, then when the access network device allocates the first paging group information to the inactive terminal device, it can directly add an offset thereto, wherein the value of offset can be any value, such as 0, etc., which is not limited by this disclosure.

As an embodiment, if the access network device can allocate the first paging group information to the inactive terminal device based on the paging assistance information provided by the core network device, and in the paging assistance information provided by the core network device, the group set id of the second paging group information allocated by the core network device to the idle terminal device is provided, then when the access network device allocates the first paging group information to the inactive terminal device, it can directly add an offset thereto, wherein the value of offset can be any value, such as 0, etc., which is not limited by this disclosure.

As an embodiment, if the access network device can allocate the first paging group information to the inactive terminal device based on the paging assistance information provided by the core network device, and in the paging assistance information provided by the core network device, the group id of the second paging group information allocated by the core network device to the idle terminal device is provided, then when the access network device allocates the first paging group information to the inactive terminal device, it can select a group from the same group set with the second paging group information. For example, the group set to which the group id of the second paging group information belongs can be found firstly, and then the group is selected therefore, etc., which is not limited by this disclosure.

As an embodiment, the grouping probability is provided in the second paging group information allocated by the core network device to the idle state terminal device, then for the access network device allocating the first paging group information to the inactive terminal device, it can limit that the grouping probability corresponds to the grouping probability range corresponding to the same group set.

For example, take the probability grouping method as an example, the grouping probability provided by the core network device is 50%, which corresponds to the group set 2. Then for the access network device allocating the first paging group information to the terminal device, it can limit that the group probability cannot be mapped to different groups, that is, it does not exceed the highest probability threshold corresponding to the group set 2.

As an embodiment, if the access network device is not allowed to allocate the first paging group information to the inactive terminal device based on the paging assistance information provided by the core network device, the access network device will no longer allocate the first paging group information to the inactive terminal device; or the access network device will no longer allocate the first paging group information to the inactive terminal device based on the implementation.

As an embodiment, the terminal device will fall back to means according to the protocol, and select a group from the same group set as that of the second paging group information allocated by the core network device to the idle state terminal device.

As an embodiment, the terminal device will fall back to means according to the protocol, and select a group from a default group set configured by the access network device for idle terminal device.

As an embodiment, the terminal device will use a default group configured by the access network device for the idle state terminal device.

As an embodiment, the terminal device in the inactive state can also use the second paging group information in the idle state.

In some embodiments, hereinafter, the description is made based on the example in which access network device allocating the first paging group information to the inactive terminal device can be limited in the same group set as that of the second paging group information allocated by the core network device to the idle state terminal device.

As an embodiment, for idle state monitoring, if the core network device allocates a group in the group set, the terminal device can monitor according to the group.

As an embodiment, for idle state monitoring, if the core network device does not allocate a group in the group set, the terminal device can select a group for monitoring according to the protocol. For example, if the core network device allocates group set 1, the terminal device can select group 1 in the group set 1 for monitoring.

As an embodiment, for inactive terminal device monitoring, if the access network device allocates a group in the same group set 1 allocated by the core network device, then the monitoring is performed according to the group. At this time, the paging assistance information allocated by the access network device to the inactive terminal device is a subset of the second paging group information allocated by the core network device to the idle terminal device. For example, the terminal device can select group 2 from the group set 1 for monitoring.

In some embodiments, under normal circumstances, if the terminal device and access network device are both in the inactive state, they will both perform monitoring according to the allocated group 2 of the group set.

Optional, under abnormal circumstances, if the context of the terminal device in the inactive state is lost on the network side, the access network device performs transmission according to the allocated group 1 of the group set 1, while the terminal device performs monitoring according to the group 2 of the group set 1, and the paging may be missed.

However, subsequently, the access network device can continue to expend the transmission range of the group in the entire group set, such as sending in 1 and 2, so that the terminal device will not miss the monitoring.

As can be seen, the advantage of the first paging group information allocated by the access network device to the inactive terminal device being a sub set of the second paging group information allocated by the core network device to the idle terminal device is that, the access network device can perform retransmission within a limited range, which provides some rules for handling access network device under abnormal circumstances. Without such rules, the probability of paging failure may be higher, which may also increase the power consumption of the terminal device.

In some embodiments, hereinafter, the description is made based on the example in which access network device allocating the first paging group information to the inactive terminal device can be limited in the different group set from that of the second paging group information allocated by the core network device to the idle state terminal device.

For example, the core network device limits the group range of inactive terminal device to group set 3, which includes group 8, group 9, group 10, and group 11, then the access network device can select one group from the group set 3, for example, group 11 may be selected, etc., which is not limited by this disclosure.

As an embodiment, under normal circumstances, the inactive terminal device selects group 11 according to the group set 3 for monitoring.

As an embodiment, under abnormal circumstances, the paging assistance information provided by the access network device will carry both the group 1 in the group set 1 and the group set 3. At this time, the access network device can initiate paging in both the group 1 in the group set 1 and the group set 3, and for the group set 3, the paging will be initiated in all the groups.

It should be noted that the above examples are only examples and cannot be used as a limitation on the paging method provided by the present disclosure.

In the above embodiments provided by the present disclosure, the methods provided by the embodiments of the present disclosure are introduced from the perspectives of access network device and core network device respectively. In order to implement each function in the method provided by the above embodiments of the present disclosure, the access network device and the core network device may include a hardware structure and a software module, and implement the above functions in the form of a hardware structure, a software module, or a hardware structure plus a software module. A certain function among the above functions can be executed by a hardware structure, a software module, or a hardware structure plus a software module.

Figure 9:
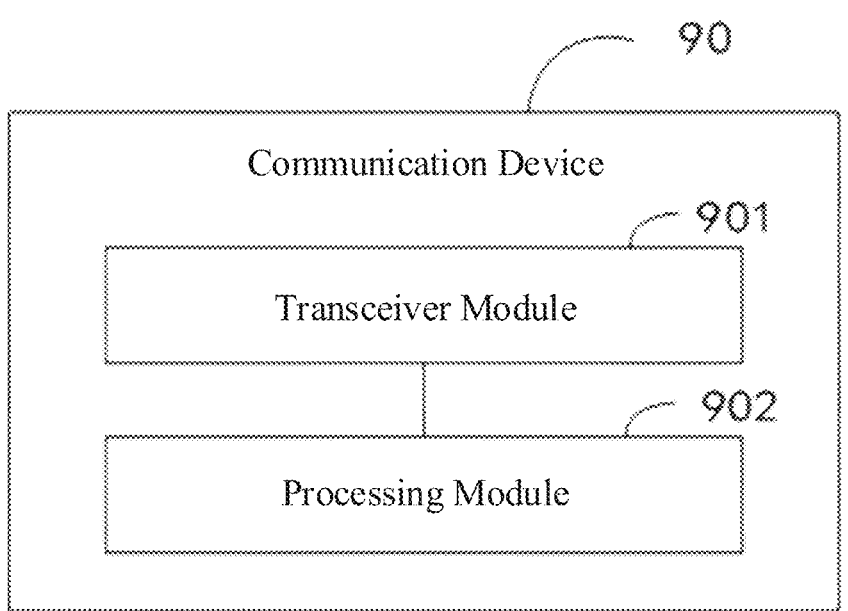
FIG. 9 is a schematic structural diagram of a communication device according to one or more embodiments of the present disclosure.

Please refer to FIG. 9, which is a schematic structural diagram of a communication device 90 provided by one or more embodiments of the present disclosure. The communication device 90 shown in FIG. 9 may include a transceiver module 901 and a processing module 902.

The transceiver module 901 may include a sending module and/or a receiving module. The sending module is used to implement the sending function, and the receiving module is used to implement the receiving function. The transceiver module 901 may implement the sending function and/or the receiving function.

It can be understood that the communication device 90 may be an access network device, a device in the access network device, or a device that can be used in conjunction with the access network device.

The communication device 90, applied on the access network device side, includes:

a transceiver module 901, configured to receive paging assistance information corresponding to a terminal device sent by a core network device; and a processing module 902, configured to determine, according to the paging assistance information, first paging group information when the terminal device is in an inactive state.

In some embodiments, the first paging group information is any one or more of the following information: paging group set identifier, paging group identifier, paging probability, paging probability indication and paging cycle.

In some embodiments, the paging assistance information includes at least one of the following:

a group range to which a paging group in the first paging group information belongs;

a group set range to which the paging group in the first paging group information belongs;

a group list to which the paging group of the first paging group information belongs;

a group identifier corresponding to the paging group of the first paging group information;

a group list identifier corresponding to the paging group of the first paging group information;

a probability range to which the paging probability in the first paging group information belongs;

a probability range identifier to which the paging probability in the first paging group information belongs;

a probability list to which the paging probability in the first paging group information belongs;

a probability list identifier to which the paging probability in the first paging group information belongs;

second paging group information when the terminal device is in an idle state;

an offset between the paging group identification in the first paging group information and the paging group identification in the second paging group information in the idle state;

an offset between the set identifier to which the paging group in the first paging group information belongs and the set identifier to which the paging group in the second paging group information in the idle state belongs; and, whether the paging group in the first paging group information belongs to a same group set with the paging group in the second paging group information in the idle state.

In some embodiments, the transceiver module 901 is further configured to receive the paging assistance information corresponding to the terminal device sent by the core network device based on core network assistance information for radio resource control RRC inactive.

In some embodiments, the transceiver module 901 is further configured to receive first indication information sent by the core network device, wherein the first indication information is at least used to indicate whether to allow the access network device to determine the first paging group information based on the paging assistance information.

In some embodiments, the processing module 902 is further configured to, in response to satisfying a triggering condition, determine, according to the paging assistance information, the first paging group information when the terminal device is in the inactive state.

In some embodiments, the processing module 902 is further configured to:

determine the triggering condition based on a protocol;

or, determine the triggering condition based on second indication information of the core network device.

In some embodiments, the processing module 902 is further configured to, based on a specified strategy, determine, according to the paging assistance information, the first paging group information when the terminal device is in the inactive state.

In some embodiments, the processing module 902 is further configured to:

determine the specified strategy based on a protocol;

or, determine the specified strategy based on third indication information of the core network device.

In some embodiments, the transceiver module 901 is further configured to, when the terminal device is in the inactive state, send a paging message to the terminal device based on the first paging group information.

In some embodiments, the processing module 902 is further configured to, in response to determining a paging monitoring failure of the terminal device, update the first paging group information according to the paging assistance information; and the transceiver module 901 is further configured to, based on the updated first paging group information, send the paging message to the terminal device.

With the communication device provided by the present disclosure, the access network device can determine the first paging group information when the terminal device is in the inactive state based on the paging assistance information corresponding to the terminal device sent by the core network device, and perform group paging to the terminal device. As a result, the probability of paging failure and the power consumption of the terminal device are reduced.

It can be understood that the communication device 90 may be a core network device, a device in the core network device, or a device that can be used in conjunction with the core network device.

The communication device 90, applied on the core network device side, includes:

a transceiver module 901, configured to send, to an access network device, paging assistance information corresponding to a terminal device, wherein the paging assistance information is used for the access network device to determine first paging group information when the terminal device is in an inactive state.

In some embodiments, the paging assistance information includes at least one of the following:

a group range to which a paging group in the first paging group information belongs;

a group set range to which the paging group in the first paging group information belongs;

a group list to which the paging group of the first paging group information belongs;

a group identifier corresponding to the paging group of the first paging group information;

a group list identifier corresponding to the paging group of the first paging group information;

a probability range to which the paging probability in the first paging group information belongs;

a probability range identifier to which the paging probability in the first paging group information belongs;

a probability list to which the paging probability in the first paging group information belongs;

a probability list identifier to which the paging probability in the first paging group information belongs;

second paging group information when the terminal device is in an idle state;

an offset between the paging group identification in the first paging group information and the paging group identification in the second paging group information in the idle state;

an offset between the set identifier to which the paging group in the first paging group information belongs and the set identifier to which the paging group in the second paging group information in the idle state belongs; and, whether the paging group in the first paging group information belongs to a same group set with the paging group in the second paging group information in the idle state.

In some embodiments, the device further includes a processing unit 902 configured to determine the paging assistance information according to second paging group information corresponding to the terminal device in the idle state.

In some embodiments, the transceiver module 901 is further configured to, send, to the access network device, the paging assistance information corresponding to the terminal device based on core network assistance information for radio resource control RRC inactive.

In some embodiments, the transceiver module 901 is further configured to, send first indication information to the access network device, wherein the first indication information is at least used to indicate whether to allow the access network device to determine the first paging group information based on the paging assistance information.

In some embodiments, the transceiver module 901 is further configured to, send second indication information to the access network device, where the second indication information is used to instruct the access network device a triggering condition for the access network device to determine the first paging group information based on the paging assistance information.

In some embodiments, the transceiver module 901 is further configured to, send third indication information to the access network device, where the third indication information is used to instruct the access network device a strategy for the access network device to determine the first paging group information based on the paging assistance information.

In some embodiments, the transceiver module 901 is further configured to, in response to determining a paging monitoring failure of the terminal device, send a paging message based on the paging assistance information and second paging group information when the terminal device is in an idle state.

With the communication device provided by the present disclosure, the core network device can send the paging assistance information corresponding to the terminal device to the access network device to assist the access network device to determine the first paging group information when the terminal device is in the inactive state based on the paging assistance information. As a result, the probability of paging failure is reduced, and the power consumption of the terminal device is also reduced.

Figure 10:
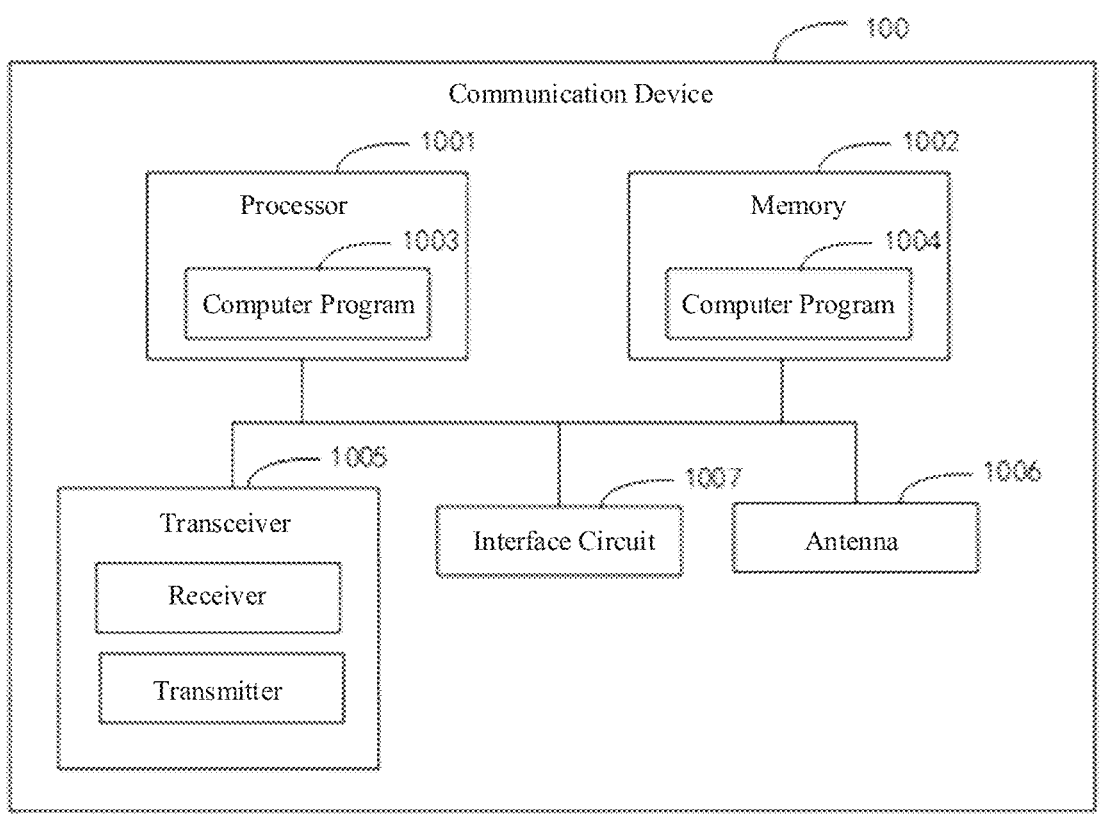
FIG. 10 is a schematic structural diagram of a communication device according to one or more embodiments of the present disclosure.

Please refer to FIG. 10, which is a schematic structural diagram of another communication device 100 provided by one or more embodiments of the present disclosure. The communication device 100 may be an access network device, or may be a core network device, or may be a chip, a chip system, a processor or the like that supports the access network device to implement the above method, or may be a chip, a chip system, a processor or the like that supports the core network device to implement the above method. The device can be used to implement the method described in the above method embodiments. For details, reference may be made to the description in the above method embodiments.

The communication device 100 may include one or more processors 1001. The processor 1001 may be a general-purpose processor or a dedicated processor, or the like. For example, the processor 1001 may be a baseband processor or a central processing unit. The baseband processor can be used to process communication protocols and communication data. The central processor can be used to control the communication devices (such as base stations, baseband chips, terminal devices, terminal device chips, DU or CU, or the like), execute computer programs, and process data for the computer programs.

In some embodiments, the communication device 100 may also include one or more memories 1002, on which a computer program 1004 may be stored. The processor 1001 executes the computer program 1004, so that the communication device 100 performs the method described in the above method embodiments. In some embodiments, the memory 1002 may also store data. The communication device 100 and the memory 1002 can be provided separately or integrated together.

In some embodiments, the communication device 100 may also include a transceiver 1005 and an antenna 1006. The transceiver 1005 may be referred to as a transceiver unit, a transceiver, a transceiver circuit, or the like, and is used to implement transceiver functions. The transceiver 1005 may include a receiver and a transmitter. The receiver may be referred to as a receiver or a receiving circuit, or the like, and is used to implement the receiving function; and the transmitter may be referred to as a transmitter, a transmitting circuit, or the like, and is used to implement the transmitting function.

In some embodiments, the communication device 100 may also include one or more interface circuits 1007. The interface circuit 1007 is used to receive code instructions and transmit the code instructions to the processor 1001. The processor 1001 executes the code instructions to cause the communication device 100 to perform the method described in the above method embodiments.

The communication device 100 is an access network device: the transceiver 1005 is used to perform block 21 in FIG. 2; block 31 in FIG. 3; block 32 in FIG. 3; block 34 in FIG. 3; block 41 in FIG. 4; block 43 in FIG. 4; block 51 in FIG. 5; block 53 in FIG. 5; or block 55 in FIG. 5. The processor 1001 is configured to execute block 22 in FIG. 2; execute block 33 in FIG. 3; block 42 in FIG. 4; block 52 in FIG. 5; or block 54 in FIG. 5.

The communication device 100 is a core network device: the transceiver 1005 is used to perform block 61 in FIG. 6; block 72 in FIG. 7; block 73 in FIG. 7; block 81 in FIG. 8; or block 82 in FIG. 8. The processor 1001 is used to execute block 71 in FIG. 7.

In one implementation, the processor 1001 may include a transceiver for implementing receiving and transmitting functions. For example, the transceiver may be a transceiver circuit, an interface, or an interface circuit. The transceiver circuits, interfaces or interface circuits used to implement the receiving and transmitting functions can be separate or integrated together. The above-mentioned transceiver circuit, interface or interface circuit can be used for reading and writing codes/data, or the above-mentioned transceiver circuit, interface or interface circuit can be used for signal transmission or transfer.

In one implementation, the processor 1001 may be stored with a computer program 1003, and the computer program 1003 is executed by the processor 1001, causing the communication device 100 to perform the method described in the above method embodiments. The computer program 1003 may be solidified in the processor 1001, in which case the processor 1001 may be implemented by hardware.

In one implementation, the communication device 100 may include a circuit, and the circuit may implement the functions of sending or receiving or communicating in the foregoing method embodiments. The processors and transceivers described in this disclosure may be implemented on an integrated circuit (IC), an analog IC, a radio frequency integrated circuit (RFIC), a mixed signal IC, an application specific integrated circuit (ASIC), a printed circuit boards (PCB), an electronic device, and the like. The processor and transceiver can also be manufactured using various IC process technologies, such as complementary metal oxide semiconductor (CMOS), N-type metal oxide semiconductor (nMetal-oxide-semiconductor, NMOS), P-type metal oxide semiconductor (positive channel metal oxide semiconductor, PMOS), bipolar junction transistor (BJT), bipolar CMOS (BiCMOS), silicon germanium (SiGe), gallium arsenide (GaAs), and the like.

The communication device described in the above embodiments may be an access network device or a core network device, but the scope of the communication device described in this disclosure is not limited thereto, and the structure of the communication device may not be limited by FIG. 10. The communication device may be a stand-alone device or may be part of a larger device. For example, the communication device may be:

(1) a stand-alone integrated circuit IC, or chip, or chip system or subsystem;

(2) a set of one or more ICs. In some embodiments, the IC set may also include storage components for storing data and computer programs;

(3) an ASIC, such as a modem;

(4) a module that can be embedded in another device;

(5) a receiver, a terminal device, an intelligent terminal device, a cellular phone, a wireless device, a handheld device, a mobile unit, a vehicle-mounted device, a network device, a cloud device, an artificial intelligence device, and the like;

(6) others, etc.

Figure 11:
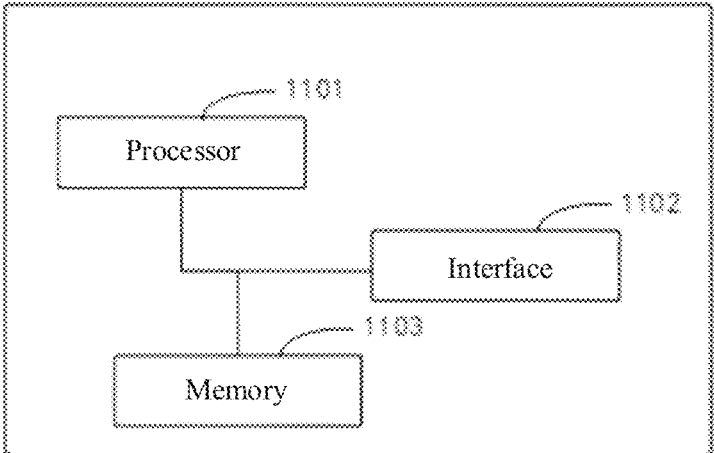
FIG. 11 is a schematic structural diagram of a chip according to one or more embodiments of the present disclosure.

For the case where the communication device may be a chip or a chip system, reference may be made to the schematic structural diagram of the chip shown in FIG. 11. The chip shown in FIG. 11 includes a processor 1101 and an interface 1102. The processor 1101 may include one or more processors, and the interface 1102 may include multiple interfaces.

For the case where the chip is used to implement the functions of the access network device in the embodiment of the present disclosure:

the interface 1002 is configured to execute the block 21 in FIG. 2; block 31 in FIG. 3; block 32 in FIG. 3; block 34 in FIG. 3; block 41 in FIG. 4; block 43 in FIG. 4; block 51 in FIG. 5; block 53 in FIG. 5; or block 55 in FIG. 5.

For the case where the chip is used to implement the functions of the core network device in the embodiment of the present disclosure:

the interface 1002 is configured to execute the block 61 in FIG. 6; block 72 in FIG. 7; block 73 in FIG. 7; block 81 in FIG. 8; or block 82 in FIG. 8.

In some embodiments, the chip also includes a memory 1103, which is used to store necessary computer programs and data.

Those skilled in the art can also understand that the various illustrative logical blocks and steps listed in the embodiments of the present disclosure can be implemented by electronic hardware, computer software, or a combination of both. Whether such functionality is implemented in hardware or software depends on the specific application and overall system design requirements. Those skilled in the art can use various methods to implement the described functions for each specific application, but such implementation should not be understood as exceeding the scope of protection of the embodiments of the present disclosure.

Embodiments of the present disclosure also provide a paging system. The system includes a communication device as an access network device and a communication device as a core network device in the embodiment of FIG. 9, or the system includes a communication device as an access network device and a communication device as a core network device in the embodiment of FIG. 10.

The present disclosure also provides a computer-readable storage medium on which instructions are stored. When the instructions are executed by a computer, the functions of any of the above method embodiments are implemented.

The present disclosure also provides a computer program product, which, when been executed by a computer, implements the functions of any of the above method embodiments.

Embodiments of the present disclosure provides the following aspects.

In a first aspect, an embodiment of the present disclosure provides a paging method executed by an access network device, and the method includes: receiving paging assistance information corresponding to a terminal device sent by a core network device; and determining, according to the paging assistance information, first paging group information when the terminal device is in an inactive state.

In this implementation, after receiving the paging assistance information corresponding to the terminal device sent by the core network device, the access network device may determine the first paging group information when the terminal device is in the inactive state based on the paging assistance information, and perform group paging to the terminal device. As a result, the probability of paging failure and the power consumption of the terminal device are reduced.

In some embodiments, the first paging group information is any one or more of the following information: paging group set identifier, paging group identifier, paging probability, paging probability indication and paging cycle.

In some embodiments, the paging assistance information includes at least one of the following:

a group range to which a paging group in the first paging group information belongs;

a group set range to which the paging group in the first paging group information belongs;

a group list to which the paging group of the first paging group information belongs;

a group identifier corresponding to the paging group of the first paging group information;

a group list identifier corresponding to the paging group of the first paging group information;

a probability range to which the paging probability in the first paging group information belongs;

a probability range identifier to which the paging probability in the first paging group information belongs;

a probability list to which the paging probability in the first paging group information belongs;

a probability list identifier to which the paging probability in the first paging group information belongs;

second paging group information when the terminal device is in an idle state;

an offset between the paging group identification in the first paging group information and the paging group identification in the second paging group information in the idle state;

an offset between the set identifier to which the paging group in the first paging group information belongs and the set identifier to which the paging group in the second paging group information in the idle state belongs; and, whether the paging group in the first paging group information belongs to a same group set with the paging group in the second paging group information in the idle state.

In some embodiments, the receiving the paging assistance information corresponding to the terminal device sent by the core network device, includes: receiving the paging assistance information corresponding to the terminal device sent by the core network device based on core network assistance information for radio resource control RRC inactive.

In some embodiments, the method further includes: receiving first indication information sent by the core network device, wherein the first indication information is at least used to indicate whether to allow the access network device to determine the first paging group information based on the paging assistance information.

In some embodiments, the determining, according to the paging assistance information, the first paging group information when the terminal device is in the inactive state, includes: in response to satisfying a triggering condition, determining, according to the paging assistance information, the first paging group information when the terminal device is in the inactive state.

In some embodiments, the method further includes:

determining the triggering condition based on a protocol; or, determining the triggering condition based on second indication information of the core network device.

In some embodiments, the determining, according to the paging assistance information, the first paging group information when the terminal device is in the inactive state, includes:

based on a specified strategy, determining, according to the paging assistance information, the first paging group information when the terminal device is in the inactive state.

In some embodiments, the method further includes:

determining the specified strategy based on a protocol; or, determining the specified strategy based on third indication information of the core network device.

In some embodiments, the method further includes: when the terminal device is in the inactive state, sending a paging message to the terminal device based on the first paging group information.

In some embodiments, the method further includes:

in response to determining a paging monitoring failure of the terminal device, updating the first paging group information according to the paging assistance information;

based on the updated first paging group information, sending the paging message to the terminal device.

In a second aspect, an embodiment of the present disclosure provides another paging method executed by a core network device, and the method includes: sending, to an access network device, paging assistance information corresponding to a terminal device, wherein the paging assistance information is used for the access network device to determine first paging group information when the terminal device is in an inactive state.

In this implementation, the core network device may send the paging assistance information corresponding to the terminal device to the access network device to assist the access network device to determine the first paging group information when the terminal device is in the inactive state based on the paging assistance information. As a result, the probability of paging failure is reduced, and the power consumption of the terminal device is also reduced.

In some embodiments, the paging assistance information includes at least one of the following:

a group range to which a paging group in the first paging group information belongs;

a group set range to which the paging group in the first paging group information belongs;

a group list to which the paging group of the first paging group information belongs;

a group identifier corresponding to the paging group of the first paging group information;

a group list identifier corresponding to the paging group of the first paging group information;

a probability range to which the paging probability in the first paging group information belongs;

a probability range identifier to which the paging probability in the first paging group information belongs;

a probability list to which the paging probability in the first paging group information belongs;

a probability list identifier to which the paging probability in the first paging group information belongs;

second paging group information when the terminal device is in an idle state;

an offset between the paging group identification in the first paging group information and the paging group identification in the second paging group information in the idle state;

an offset between the set identifier to which the paging group in the first paging group information belongs and the set identifier to which the paging group in the second paging group information in the idle state belongs; and, whether the paging group in the first paging group information belongs to a same group set with the paging group in the second paging group information in the idle state.

In some embodiments, the method further includes: determining the paging assistance information according to second paging group information corresponding to the terminal device in the idle state.

In some embodiments, the sending, to the access network device, the paging assistance information corresponding to the terminal device, includes:

sending, to the access network device, the paging assistance information corresponding to the terminal device based on core network assistance information for radio resource control RRC inactive.

In some embodiments, the method further includes: sending first indication information to the access network device, wherein the first indication information is at least used to indicate whether to allow the access network device to determine the first paging group information based on the paging assistance information.

In some embodiments, the method further includes: sending second indication information to the access network device, where the second indication information is used to instruct the access network device a triggering condition for the access network device to determine the first paging group information based on the paging assistance information.

In some embodiments, the method further includes:

sending third indication information to the access network device, where the third indication information is used to instruct the access network device a strategy for the access network device to determine the first paging group information based on the paging assistance information.

In some embodiments, the method further includes: in response to determining a paging monitoring failure of the terminal device, sending a paging message based on the paging assistance information and second paging group information when the terminal device is in an idle state.

In a third aspect, an embodiment of the present disclosure provides a communication device applied at an access network device side, and the device includes:

a transceiver module, configured to receive paging assistance information corresponding to a terminal device sent by a core network device; and a processing module, configured to determine, according to the paging assistance information, first paging group information when the terminal device is in an inactive state.

In some embodiments, the first paging group information is any one or more of the following information: paging group set identifier, paging group identifier, paging probability, paging probability indication and paging cycle.

In some embodiments, the paging assistance information includes at least one of the following:

a group range to which a paging group in the first paging group information belongs;

a group set range to which the paging group in the first paging group information belongs;

a group list to which the paging group of the first paging group information belongs;

a group identifier corresponding to the paging group of the first paging group information;

a group list identifier corresponding to the paging group of the first paging group information;

a probability range to which the paging probability in the first paging group information belongs;

a probability range identifier to which the paging probability in the first paging group information belongs;

a probability list to which the paging probability in the first paging group information belongs;

a probability list identifier to which the paging probability in the first paging group information belongs;

second paging group information when the terminal device is in an idle state;

an offset between the paging group identification in the first paging group information and the paging group identification in the second paging group information in the idle state;

an offset between the set identifier to which the paging group in the first paging group information belongs and the set identifier to which the paging group in the second paging group information in the idle state belongs; and, whether the paging group in the first paging group information belongs to a same group set with the paging group in the second paging group information in the idle state.

In some embodiments, the transceiver module is further configured to receive the paging assistance information corresponding to the terminal device sent by the core network device based on core network assistance information for radio resource control RRC inactive.

In some embodiments, the transceiver module is further configured to receive first indication information sent by the core network device, wherein the first indication information is at least used to indicate whether to allow the access network device to determine the first paging group information based on the paging assistance information.

In some embodiments, the processing module is further configured to, in response to satisfying a triggering condition, determine, according to the paging assistance information, the first paging group information when the terminal device is in the inactive state.

In some embodiments, the processing module is further configured to:

determine the triggering condition based on a protocol;

or, determine the triggering condition based on second indication information of the core network device.

In some embodiments, the processing module is further configured to, based on a specified strategy, determine, according to the paging assistance information, the first paging group information when the terminal device is in the inactive state.

In some embodiments, the processing module is further configured to:

determine the specified strategy based on a protocol;

or, determine the specified strategy based on third indication information of the core network device.

In some embodiments, the transceiver module is further configured to, when the terminal device is in the inactive state, send a paging message to the terminal device based on the first paging group information.

In some embodiments, the processing module is further configured to, in response to determining a paging monitoring failure of the terminal device, update the first paging group information according to the paging assistance information; and the transceiver module is further configured to, based on the updated first paging group information, send the paging message to the terminal device.

In a fourth aspect, an embodiment of the present disclosure provides a communication device applied at a core network device side, and the device includes: a transceiver module, configured to send, to an access network device, paging assistance information corresponding to a terminal device, wherein the paging assistance information is used for the access network device to determine first paging group information when the terminal device is in an inactive state.

In some embodiments, the paging assistance information includes at least one of the following:

a group range to which a paging group in the first paging group information belongs;

a group set range to which the paging group in the first paging group information belongs;

a group list to which the paging group of the first paging group information belongs;

a group identifier corresponding to the paging group of the first paging group information;

a group list identifier corresponding to the paging group of the first paging group information;

a probability range to which the paging probability in the first paging group information belongs;

a probability range identifier to which the paging probability in the first paging group information belongs;

a probability list to which the paging probability in the first paging group information belongs;

a probability list identifier to which the paging probability in the first paging group information belongs;

second paging group information when the terminal device is in an idle state;

an offset between the paging group identification in the first paging group information and the paging group identification in the second paging group information in the idle state;

an offset between the set identifier to which the paging group in the first paging group information belongs and the set identifier to which the paging group in the second paging group information in the idle state belongs; and, whether the paging group in the first paging group information belongs to a same group set with the paging group in the second paging group information in the idle state.

In some embodiments, the device further includes a processing unit configured to determine the paging assistance information according to second paging group information corresponding to the terminal device in the idle state.

In some embodiments, the transceiver module is further configured to, send, to the access network device, the paging assistance information corresponding to the terminal device based on core network assistance information for radio resource control RRC inactive.

In some embodiments, the transceiver module is further configured to, send first indication information to the access network device, wherein the first indication information is at least used to indicate whether to allow the access network device to determine the first paging group information based on the paging assistance information.

In some embodiments, the transceiver module is further configured to, send second indication information to the access network device, where the second indication information is used to instruct the access network device a triggering condition for the access network device to determine the first paging group information based on the paging assistance information.

In some embodiments, the transceiver module is further configured to, send third indication information to the access network device, where the third indication information is used to instruct the access network device a strategy for the access network device to determine the first paging group information based on the paging assistance information.

In some embodiments, the transceiver module is further configured to, in response to determining a paging monitoring failure of the terminal device, send a paging message based on the paging assistance information and second paging group information when the terminal device is in an idle state.

In a fifth aspect, an embodiment of the present disclosure provides a communication device, which includes a processor, when the process invokes a computer program stored in a memory, the method according to the above first aspect is implemented.

In a sixth aspect, an embodiment of the present disclosure provides a communication device, which includes a processor, when the process invokes a computer program stored in a memory, the method according to the above second aspect is implemented.

In a seventh aspect, an embodiment of the present disclosure provides a communication device, which includes a processor and a memory, a computer program is stored in the memory, and the computer program stored in the memory is executed by the processor, to cause the device to implement the method according to the above first aspect.

In an eighth aspect, an embodiment of the present disclosure provides a communication device, which includes a processor and a memory, a computer program is stored in the memory, and the computer program stored in the memory is executed by the processor, to cause the device to implement the method according to the above second aspect.

In a ninth aspect, an embodiment of the present disclosure provides a communication device, which includes a processor and an interface circuit; the interface circuit is configured to receive code instructions and transmit the code instructions to the processor; and the processor is configured to execute the code instructions to implement the method according to the above first aspect.

In a tenth aspect, an embodiment of the present disclosure provides a communication device, which includes a processor and an interface circuit; the interface circuit is configured to receive code instructions and transmit the code instructions to the processor; and the processor is configured to execute the code instructions to implement the method according to the above second aspect.

In an eleventh aspect, an embodiment of the present disclosure provides a paging system, which includes the communication device described in the third aspect and the communication device described in the fourth aspect, or the system includes the communication device described in the fifth aspect and the communication device described in the sixth aspect, or the system includes the communication device described in the seventh aspect and the communication device described in the eighth aspect, or the system includes the communication device described in the ninth aspect and the communication device described in the tenth aspect.

In a twelfth aspect, an embodiment of the present disclosure provides a computer-readable storage medium for storing instructions used by the above access network device. When the instructions are executed, the method described in the first aspect is implemented.

In a thirteenth aspect, an embodiment of the present disclosure provides a computer-readable storage medium for storing instructions used by the above core network device. When the instructions are executed, the method described in the second aspect is implemented.

In a fourteenth aspect, the present disclosure also provides a computer program product including a computer program, which when been executed on a computer causes the computer to execute the method described in the first aspect.

In a fifteenth aspect, the present disclosure also provides a computer program product including a computer program, which when been executed on a computer causes the computer to execute the method described in the second aspect.

In a sixteenth aspect, the present disclosure provides a chip system. The chip system includes at least one processor and an interface for supporting the access network device to implement the functions involved in the first aspect, for example, determining or processing at least one of the data and information involved in the above method. In a possible design, the chip system further includes a memory, and the memory is used to store necessary computer programs and data for the access network device. The chip system may include chips, or may include chips and other discrete devices.

In a seventeenth aspect, the present disclosure provides a chip system. The chip system includes at least one processor and an interface for supporting the core network device to implement the functions involved in the second aspect, for example, determining or processing at least one of the data and information involved in the above method. In a possible design, the chip system further includes a memory, and the memory is used to store necessary computer programs and data for the core network device. The chip system may include chips, or may include chips and other discrete devices.

In an eighteenth aspect, the present disclosure provides a computer program that, when been executed on a computer, causes the computer to execute the method described in the above first aspect.

In a nineteenth aspect, the present disclosure provides a computer program that, when been executed on a computer, causes the computer to perform the method described in the above second aspect.

In the above embodiments, it may be implemented in whole or in part by software, hardware, firmware, or any combination thereof. When implemented by software, it may be implemented in whole or in part in the form of a computer program product. The computer program product includes one or more computer programs. When the computer program is loaded and executed on a computer, the processes or functions described in accordance with the embodiments of the present disclosure are generated in whole or in part. The computer may be a general-purpose computer, a dedicated computer, a computer network, or other programmable device. The computer program may be stored in a computer-readable storage medium, or been transferred from one computer-readable storage medium to another, for example, the computer program may be transferred from a website, computer, server, or data center to another website, computer, server or data center via wired (such as coaxial cable, optical fiber, digital subscriber line (DSL)) or wireless (such as infrared, wireless, microwave, or the like) means. The computer-readable storage medium may be any available medium that can be accessed by a computer, or a data storage device such as an integrated server, data center, or the like, that includes one or more available media. The available media may be magnetic media (e.g., floppy disks, hard disks, magnetic tapes), optical media (e.g., high-density digital video discs (DVD)), or semiconductor media (e.g., solid state disks, SSD)) or the like.

Those of ordinary skill in the art can understand that the first, second, and other numerical numbers involved in this disclosure are only distinctions made for convenience of description and are not used to limit the scope of the embodiments of the disclosure, nor to indicate the order.

At least one in the present disclosure can also be described as one or more, and the plurality can be two, three, four or more, which is not limited in the present disclosure. In the embodiment of the present disclosure, for one type of technical feature, "first", "second", "third", "A", "B", "C" and "D", or the like are used to distinguish the technical features in the type of technical feature, and the technical features described with "first", "second", "third", "A", "B", "C" and "D" are in no order of precedence or order of size.

The corresponding relationships shown in each table in this disclosure can be configured or predefined. The values of the information in each table are only examples and can be configured as other values, which is not limited by this disclosure. When configuring the correspondence between information and each parameter, it is not necessarily required to configure all the correspondences shown in each table. For example, in the table in this disclosure, the corresponding relationships shown in some rows may not be configured. For another example, appropriate deformation adjustments can be made based on the above table, such as splitting, merging, or the like. The names of the parameters shown in the titles of the above tables may also be other names understandable by the communication device, and the values or expressions of the parameters may also be other values or expressions understandable by the communication device. When implementing the above tables, other data structures can also be used, such as arrays, queues, containers, stacks, linear lists, pointers, linked lists, trees, graphs, structures, classes, heaps, hash tables, or the like.

Predefinition in this disclosure may be understood as definition, pre-definition, storage, pre-storage, pre-negotiation, pre-configuration, firming, or pre-burning.

Those of ordinary skill in the art will appreciate that the units and algorithm steps of each example described in conjunction with the embodiments disclosed herein can be implemented with electronic hardware, or a combination of computer software and electronic hardware. Whether these functions are implemented in hardware or software depends on the specific application and design restrictions of the technical solution. Those skilled in the art may implement the described functions using different methods for each specific application, but such implementations should not be considered to be beyond the scope of this disclosure.

Those skilled in the art can clearly understand that for the convenience and simplicity of description, the specific operating processes of the systems, devices and units described above can be referred to the corresponding processes in the foregoing method embodiments, which will not be described again here.

The above are only specific embodiments of the present disclosure, but the protection scope of the present disclosure is not limited thereto. Any changes or substitutions easily conceivable to those skilled in the art within the technical scope disclosed in the present disclosure should be covered by the protection scope of this disclosure. Therefore, the protection scope of the present disclosure should be subject to the protection scope of the claims.

What is claimed is:

1. A paging method executed by an access network device, comprising:

receiving paging assistance information corresponding to a terminal device sent by a core network device;

determining, according to the paging assistance information, first paging group information in response to the terminal device being in an inactive state, in response to the terminal device being in the inactive state, sending a paging message to the terminal device based on the first paging group information;

in response to determining a paging monitoring failure of the terminal device, updating the first paging group information according to the paging assistance information; and based on updated first paging group information, sending the paging message to the terminal device.

2. The method according to claim 1, wherein the first paging group information comprises: paging group set identifier, paging group identifier, paging probability, paging probability indication or paging cycle.

3. The method according to claim 1, wherein the paging assistance information comprises at least one of the following information:

a group range to which a paging group in the first paging group information belongs;

a group set range to which the paging group in the first paging group information belongs;

a group list to which the paging group in the first paging group information belongs;

a group identifier corresponding to the paging group in the first paging group information;

a group list identifier corresponding to the paging group in the first paging group information;

a probability range to which the paging probability in the first paging group information belongs;

a probability range identifier to which the paging probability in the first paging group information belongs;

a probability list to which the paging probability in the first paging group information belongs;

a probability list identifier to which the paging probability in the first paging group information belongs;

second paging group information in response to the terminal device being in an idle state;

an offset between the paging group identifier in the first paging group information and a paging group identifier in the second paging group information of the idle state;

an offset between the paging group set identifier to which the paging group in the first paging group information belongs and a paging group set identifier to which the paging group in the second paging group information in the idle state belongs; and whether the paging group in the first paging group information belongs to a same group set with a paging group in the second paging group information in the idle state.

4. The method according to claim 1, wherein the receiving the paging assistance information corresponding to the terminal device sent by the core network device, comprises:

receiving the paging assistance information corresponding to the terminal device sent by the core network device based on core network assistance information for radio resource control (RRC) inactive state.

5. The method according to claim 1, further comprising:

receiving first indication information sent by the core network device, wherein the first indication information is at least configured to indicate whether to allow the access network device to determine the first paging group information based on the paging assistance information.

6. The method according to claim 1, wherein the determining, according to the paging assistance information, the first paging group information in response to the terminal device being in the inactive state, comprises:

in response to satisfying a triggering condition, determining, according to the paging assistance information, the first paging group information in response to the terminal device being in the inactive state.

7. The method according to claim 6, further comprising:

determining the triggering condition based on a protocol; or determining the triggering condition based on second indication information of the core network device.

8. The method according to claim 1, wherein the determining, according to the paging assistance information, the first paging group information in response to the terminal device being in the inactive state, comprises:

based on a specified strategy, determining, according to the paging assistance information, the first paging group information in response to the terminal device being in the inactive state.

9. The method according to claim 8, further comprising:

determining the specified strategy based on a protocol; or determining the specified strategy based on third indication information of the core network device.

10. A paging method executed by a core network device, comprising:

sending, to an access network device, paging assistance information corresponding to a terminal device, wherein the paging assistance information is configured for the access network device to determine first paging group information in response to the terminal device being in an inactive state; and in response to determining a paging monitoring failure of the terminal device, sending a paging message based on the paging assistance information and second paging group information in response to the terminal device being in an idle state.

11. The method according to claim 10, wherein the paging assistance information comprises at least one of the following information:

a group range to which a paging group in the first paging group information belongs;

a group set range to which the paging group in the first paging group information belongs;

a group list to which the paging group in the first paging group information belongs;

a group identifier corresponding to the paging group in the first paging group information;

a group list identifier corresponding to the paging group in the first paging group information;

a probability range to which the paging probability in the first paging group information belongs;

a probability range identifier to which the paging probability in the first paging group information belongs;

a probability list to which the paging probability in the first paging group information belongs;

a probability list identifier to which the paging probability in the first paging group information belongs;

second paging group information in response to the terminal device being in an idle state;

an offset between the paging group identifier in the first paging group information and a paging group identifier in the second paging group information of the idle state;

an offset between the paging group set identifier to which the paging group in the first paging group information belongs and a paging group set identifier to which the paging group in the second paging group information in the idle state belongs; and whether the paging group in the first paging group information belongs to a same group set with a paging group in the second paging group information in the idle state.

12. The method according to claim 10, further comprising:

determining the paging assistance information according to second paging group information corresponding to the terminal device in the idle state.

13. The method according to claim 10, wherein the sending, to the access network device, the paging assistance information corresponding to the terminal device, comprises:

sending, to the access network device, the paging assistance information corresponding to the terminal device based on core network assistance information for radio resource control (RRC) inactive state.

14. The method according to claim 10, further comprising:
sending first indication information to the access network device, wherein the first indication information is at least configured to indicate whether to allow the access network device to determine the first paging group information based on the paging assistance information.

15. The method according to claim 10, further comprising:
sending second indication information to the access network device, wherein the second indication information is configured to instruct the access network device a triggering condition for the access network device to determine the first paging group information based on the paging assistance information; or
sending third indication information to the access network device, wherein the third indication information is configured to instruct the access network device a strategy for the access network device to determine the first paging group information based on the paging assistance information.

16. A communication device, comprising a processor and a memory, wherein a computer program is stored in the memory, and the computer program stored in the memory is executed by the processor, to cause the device to implement the method according to claim 10.

17. A communication device, comprising a processor and a memory, wherein a computer program is stored in the memory, and the computer program stored in the memory is executed by the processor, to cause the device to perform acts comprising:
receiving paging assistance information corresponding to a terminal device sent by a core network device;
determining, according to the paging assistance information, first paging group information in response to the terminal device being in an inactive state;
in response to the terminal device being in the inactive state, sending a paging message to the terminal device based on the first paging group information, and
in response to determining a paging monitoring failure of the terminal device, updating the first paging group information according to the paging assistance information; and based on updated first paging group information, sending the paging message to the terminal device.

* * * * *